United States Patent
Onoe et al.

(10) Patent No.: US 7,122,604 B2
(45) Date of Patent: Oct. 17, 2006

(54) MODIFIED PROPYLENE POLYMER, COMPOSITION CONTAINING THE SAME AND USE THEREOF

(75) Inventors: Masato Onoe, Mie (JP); Teruaki Ashihara, Mie (JP); Kazuyuki Hata, Mie (JP); Fumihiko Shimizu, Kanagawa (JP); Naomasa Sato, Kanagawa (JP); Akio Tanna, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/986,341

(22) Filed: Nov. 12, 2004

(65) Prior Publication Data

US 2005/0075441 A1 Apr. 7, 2005

Related U.S. Application Data

(63) Continuation of application No. 10/284,241, filed on Oct. 31, 2002, now Pat. No. 6,887,943.

(30) Foreign Application Priority Data

Nov. 1, 2001 (JP) ............................. 2001-336078

(51) Int. Cl.
C08F 255/02 (2006.01)

(52) U.S. Cl. ........................ 525/285; 525/74; 525/78; 525/80; 525/268; 525/301; 525/302; 525/322; 524/582; 156/327

(58) Field of Classification Search ................. 525/74, 525/78, 80, 268, 285, 301, 302, 322; 524/582; 156/327

See application file for complete search history.

(56) References Cited

U.S. PATENT DOCUMENTS

| | | | |
|---|---|---|---|
| 3,853,969 A | 12/1974 | Kontos | |
| 4,335,225 A | 6/1982 | Collete et al. | |
| 4,522,982 A | 6/1985 | Ewen | |
| 5,278,264 A | 1/1994 | Spaleck et al. | |
| 5,665,820 A | 9/1997 | Leistner et al. | |
| 5,695,838 A | 12/1997 | Tanaka et al. | |
| 5,892,081 A | 4/1999 | Süling et al. | |
| 6,191,232 B1 | 2/2001 | Mitsutani et al. | |
| 6,218,558 B1 | 4/2001 | Kato et al. | |
| 6,548,603 B1 | 4/2003 | Saton et al. | |
| 6,635,733 B1 | 10/2003 | Yahata et al. | |
| 6,887,943 B1 * | 5/2005 | Onoe et al. ................. 525/285 |
| 6,906,155 B1 | 6/2005 | Minami et al. | |
| 2004/0162403 A1 | 8/2004 | Shimizu et al. | |

FOREIGN PATENT DOCUMENTS

| | | |
|---|---|---|
| EP | 0 537 130 A1 | 4/1993 |
| EP | 0 636 653 | 2/1995 |
| JP | 10-273507 | 10/1998 |

OTHER PUBLICATIONS

U.S. Appl. No. 11/207,932, filed Aug. 22, 2005, Onoe, et al.
Buscio et al, New Evidence on the Nature of the Active Sites in Heterogeneous Ziegler-Natta Catalysts for Propene Polymerization, MACROMOLECULES, 1997, 30, pp. 4786-4790.
Derwent Publications, AN 2002-164097, XP-002261223, WO 01/85815, Nov. 15, 2001.
Derwent Publications, AN 1996-439604, XP-002261224, JP 08-217835, Aug. 27, 1996.
Burtant et al, Block and Graft Copolymers, Reinhold Publishing, N.Y., 1960, pp. 153-154.
Collette et al, "Elastomeric Polypropylenes from Alumina-Supported Tetraalkyl Group IVB Catalysts", American Chemical Society, 1989, 22, pp. 3851-3858.
Geoffrey W. Coates, "Precise Control of Polyolefin Stereochemistry Using Single-Site Metal Catalysts", Chem. Rev. 2000, 100, pp. 1223-1252.
John A. Ewen, Mechanisms of Stereochemical Control in Propylene Polymerizations with Soluble Group 4B Metallocene/Methylalumoxane Catalysts, J. Am. Chem. Soc., 1984, 106, pp. 6355-6364.
Uozumi et al, "Isospecific Propylene Polymerization Using the $[ArN(Ch_2)_3NAr]TiCl_2/Al(Bu)_3/Ph_3CH(C_6F_5)_4$ Catalyst System in the Presence of Cyclohexene", Macromol. Chem. Phys. 2001, 202, No. 17, pp. 3279-3283.
Patent Abstracts of Japan—Machine English Translation of JP 10-273507.

* cited by examiner

Primary Examiner—Fred Teskin
(74) Attorney, Agent, or Firm—Oblon, Spivak, McClelland, Maier & Neustadt, P.C.

(57) ABSTRACT

This invention provides a graft modified polypropylene polymer which does not contain halogens, is excellent in certain properties such as solubility and can add good adhesiveness and coating ability to crystalline propylene polymer base materials, and a composition containing the same; and in particular, it provides a propylene polymer which contains a propylene polymer main chain having a stereo-block structure containing an isotactic block and a side chain containing a carboxylic acid group, an acid anhydride group or a carboxylic acid ester group, wherein when it is dissolved in toluene to a concentration of 10% by weight at 25° C., the insoluble matter is 1% by weight or less based on the total polymer, and a composition containing the same.

23 Claims, No Drawings

MODIFIED PROPYLENE POLYMER, COMPOSITION CONTAINING THE SAME AND USE THEREOF

FIELD OF THE INVENTION

This invention relates to a novel propylene polymer. More illustratively, it relates to a propylene polymer which has good solubility in organic solvents such as toluene and is used as materials such as finishing agents, adhesives and paints particularly for olefin polymers having crystallinity, particularly to a graft modified propylene polymer and an adhesive composition containing this polymer.

BACKGROUND OF THE INVENTION

Propylene polymers and propylene-α-olefin copolymers are used in broad fields, because they are inexpensive and have superior properties such as mechanical property, heat resistance, solvent resistance and water resistance. However, such propylene polymers generally have low polarity because of the absence of polar groups in their molecules, thus posing a disadvantage of being difficult to effect coating and adhesion. In order to improve this disadvantage, various techniques have been attempted, such as chemical treatment of the surface of moldings of these propylene polymers with solvents and oxidation treatment of the surface of moldings by techniques such as corona discharge treatment, plasma treatment and flame treatment. However, these methods require special apparatus, and it cannot be said that their effects to improve coating property and adhesiveness are sufficient.

Accordingly, a so-called chlorinated polypropylene has been developed as a device for adding good coating ability and adhesiveness to propylene polymers by a relatively convenient method. The chlorinated polypropylene is generally soluble in hydrocarbon solvents such as toluene and xylene and, what is more, its adhesiveness to base materials such as propylene polymers is relatively good. Thus, coating ability and adhesiveness of propylene polymers can be improved by a relatively simple method in which a hydrocarbon solution of the chlorinated polypropylene is coated on the surface of a propylene polymer to be used as the base material and then the solvent is removed. In this connection, it is known that a modified chlorinated polypropylene obtained by further modifying the chlorinated polypropylene by graft copolymerization of a polar monomer has further superior effect to improve coating ability and adhesiveness.

Accordingly, though coating ability and adhesiveness of propylene polymers can be improved relatively conveniently using the chlorinated polypropylene or modified chlorinated polypropylene, there is a problem of containing chlorine in a large amount. In recent years, the use of vinyl chloride resins is causing a social problem due to possible generation of toxic substances by inadequate incineration of the resins, and the chlorine-containing resins also have problems remained unsolved such as poor weather resistance. Thus, great concern has been directed toward the development of a substitute resin for chlorinated polypropylene as in the case of vinyl chloride resins, which does not contain halogens such as chlorine.

In view of such background, on the other hand, development of a resin containing no chlorine has been attempted. For example, Japanese Patent Publication No. 958/1969 discloses a treating agent in which an amorphous polypropylene polymer modified with a specified ratio of maleic acid or its anhydride is dissolved in a solvent. In this case, the amorphous polypropylene polymer is an amorphous polymer which contains at least about 20 mol % of propylene unit in atactic polypropylene and copolymer as occasion demands and comprises a copolymer of at least one comonomer and propylene. Also, as a similar treating agent, Japanese Patent Laid-Open No. 217835/1996 discloses an amorphous polymer in which unsaturated carboxylic acids having from 3 to 10 carbon atoms are graft-copolymerized with an amorphous polypropylene or amorphous propylene-1-butene copolymer. When such a graft modified polymer is used, it has improved solubility and superior coating ability in comparison with general modified propylene resins, but it still has low solubility in solvents at room temperature, shows stickiness, and is poor in adhesiveness. Thus, for the purpose of using as a finishing agent, an adhesive or a paint, it is considered that the chlorinated polypropylene or modified chlorinated polypropylene is a relatively excellent resin at present.

SUMMARY OF THE INVENTION

An object of this invention is to provide a novel propylene polymer, particularly a graft modified propylene polymer and a composition containing the same which do not contain halogens such as chlorine, have no stickiness and excellent in solubility, and can add good adhesiveness and coating ability to base materials such as crystalline propylene polymers.

With the aim of solving the problems involved in the art, the present inventors have conducted intensive studies and accomplished the invention as a result of the efforts.

Accordingly, the gist of the invention resides in a propylene polymer which comprises a propylene polymer main chain having a stereo-block structure containing an isotactic block and a side chain containing a carboxylic acid group, an acid anhydride group or a carboxylic acid ester group (to be generally referred to as carboxylic acid group hereinafter), wherein when it is dissolved in toluene to a concentration of 10% by weight at 25° C., the insoluble matter is 1% by weight or less based on the total polymer; a propylene polymer having characteristics (a) and (b), (a) when it is dissolved in toluene to a concentration of 10% by weight at 25° C., the insoluble matter is 1% by weight or less based on the total polymer, (b) its adhesiveness by an adhesion test (cross-cut tape method) to a polypropylene base material is 50/100 or more; and an adhesive composition which contains the propylene polymer.

Other objects and advantages of the invention will be made apparent as the description progresses.

DETAILED DESCRIPTION OF THE INVENTION

In the propylene polymer of the invention, a propylene polymer main chain having a stereo-block structure containing an isotactic block (to be referred sometimes to as propylene polymer main chain hereinafter) is graft-copolymerized with a polymerizable monomer containing a carboxyl group. This propylene polymer main chain is a propylene homopolymer or a propylene-ethylene copolymer, whose ethylene content is less than 5 weight %. The propylene polymer main chain comprises propylene [P] with the proportion of 95<[P]≦100 (weight %) and ethylene [E] with the proportion of 5>[E]≧0 (weight %), but it may contain a small amount of other comonomer components within such a range that they do not spoil the scope of the invention.

Other suitable comonomers which can be contained in the propylene polymer main chain can be selected from the group of monomers having at least one olefinic double bond, such as butene, pentene, hexene, octene, decene, butadiene, hexadiene, octadiene, cyclobutene, cyclepentene, cyclohexene, norbornene, norbornadiene, styrene and derivatives thereof. Among them, butene, pentene, hexene and octene are preferable, and butene is more preferable.

Ethylene content [E] (mol %) can be calculated as the average value of (1) the etylene content computed by α-methylene method and (2) the etylene content computed by β-methylene method, which can be measured by $^{13}$C-NMR method described later.

The value of ethylene content thus obtained has the unit of "mol %", and it can be easily converted to the value with the unit of "weight %" by using molecular weight of ethylene and propylene.

α-methylene method $[CH]_\alpha = T_A + (T_C + T_D)/2$ $[CH_2]_\alpha = T_A + 2T_C + T_D + T_{F3-5} - T_I$ $[C2]_\alpha = ([CH_2]_\alpha - [CH]_\alpha)/([CH_2]_\alpha + [CH]_\alpha)$ β-methylene method $[CH]_\beta = T_A + (T_H + 2T_I + T_D)/2$ $[CH_2]_\beta = T_A + T_D + T_{F3-5} + 2T_H + 3T_I$ $[C2]_\beta = ([CH_2]_\beta - [CH]_\beta)/([CH_2]_\beta + [CH]_\beta)$ content of ethylene $= ([C2]_\alpha + [C2]_\beta)/2$ $T_C = \sum I(37.2 - 39.2)$ $T_D = \sum I(34.8 - 36.2)$ $T_{F3-5} = \sum I(29.5 - 30.9)$ $T_H = \sum I(26.9 - 28.0)$ $T_I = \sum I(24.3 - 25.2)$ wherein I(a-b) means the integrated peak area between the chemical shift of a (ppm) and b (ppm) on $^{13}$C-NMR spectrum.

Also, when the ethylene content in the propylene polymer main chain is very small, the following value calculated by the following method has higher accuracy.

$$C2(\text{mol}\%) = \frac{\sum I(24.5 - 25.0) + \sum I(33.5 - 34.2)}{\sum I(24.5 - 25.0) + \sum I(33.5 - 34.2) + \sum I(14.2 - 23.5) + \frac{1}{2}\sum I(27.5 - 28.0)}$$

As the method for controlling the ethylene content [E] in the range of $0 \leq [E] < 5$ (weight %), adjusting the feed ratio of the propylene and ethylene for polymerization is most practical.

The ratio of propylene and ethylene can not be particularly pointed out because the results depend on the catalyst to be used. One can determine in advance the preferable feed ratio by preliminary examinations varying the feed ratio and seeing how the content changes with the catalysts to be used, and with the conditions such as pressure and temperature.

In case the content of ethylene exceeds 5 (weight %) the solubility of obtained propylene polymer main chain in solvents increases, while it tends to show poor non-tackiness and adhesiveness, and is not desirable.

It is essential that the propylene polymer main chain of the invention has a stereo-block structure containing an isotactic block, and it is desirable that it has a weight average molecular weight Mw of from 5,000 to 200,000 when measured by GPC (gel permeation chromatography). The Mw smaller than 5,000 is not desirable, because not only worsening of film forming ability becomes significant but stickiness also becomes significant after coating on a base material using a propylene polymer modified by graft copolymerization (to be referred sometimes to as graft modified polymer hereinafter). Also, the Mw exceeding 200,000 is not desirable because, though there are no big problems regarding the film forming ability and stickiness, viscosity becomes too high when the graft modified polymer is dissolved in a solvent, thus causing an inconvenience in view of the production or handling of the graft modified polymer solution. According to the invention, the weight average molecular weight Mw is within the range of preferably from 5,000 to 200,000, but more preferably from 10,000 to 180,000 and most preferably from 30,000 to 150,000.

In this connection, measurement of molecular weight by GPC can be carried out by a conventionally known method using commercially available apparatus, a solvent such as o-dichlorobenzene and polystyrene as the standard sample.

Regarding molecular weight distribution of the propylene polymer main chain of the invention, there is no particular limitation, but too broad molecular weight distribution should be avoided because it means inevitably large content of low molecular weight components. When the ratio of weight average molecular weight Mw to number average molecular weight Mn, Mw/Mn, is used as an index of the molecular weight distribution, it is preferably Mw/Mn<20, more preferably Mw/Mn<10, most preferably Mw/Mn<5.

As described above, the propylene polymer main chain of the invention has a stereo-block structure containing an isotactic block, and those which are produced using a specific catalyst and have smaller heptane-insoluble matter are desirable. Particularly, those which have the characteristic defined as described in the foregoing by $^{13}$C-NMR spectrum are more desirable. This characteristic means that a block having high crystallinity and a block having high amorphous property are present in the propylene polymer main chain in good balance, and that the block having high crystallinity is in a structure rich in isotactic property. That is, since solubility in a solvent worsens when the ratio of a block having high crystallinity being present in the polymer main chain is too large, balance of the block having high crystallinity and the block having high amorphous property becomes important, and the requirement defined by $^{13}$C-NMR spectrum is applied as a part of indexes representing this balance.

The method for measuring $^{13}$C-NMR spectrum in the invention is as follows.

A 350 to 500 mg portion of a sample is completely dissolved using about 2.2 ml of o-dichlorobenzene in a 10 mm φ NMR sample tube. Next, this is homogenized by adding about 0.2 ml of benzene deuteride as a lock solvent, and then the measurement is carried out at 130° C. by a proton complete decoupling method. The measuring conditions are set to a flip angle of 90° and a pulse interval of $5T_1$ or more ($T_1$ is the longest value among spin-lattice relaxation times of methyl group). Since spin-lattice relaxation times of methylene group and methine group are shorter than those of methyl group, recovery of magnetization of all carbons is 99% or more. In this connection, in order to improve determination accuracy, it is desirable to use an NMR apparatus of 125 MHz or more as the $^{13}C$ nuclear resonance frequency and carry out-integration for 20 hours or more.

Regarding the chemical shift, among 10 kinds of pentads of the propylene unit chain region comprising a head to tail bond (mmmm, mmmr, rmmr, mmrr, ummm, rmrr, rmrm, rrrr, rrrm and mrrm), chemical shift of a peak based on the third unit methyl group of five continuous propylene units in which all of the methyl branch absolute configurations are identical, namely, the pentad represented by mmmm, is set at 21.8 ppm, and chemical shifts of other carbon peaks are determined using this as the standard. According to this standard, in the case of other five continuous propylene units, for example, chemical shift of a peak based on the third unit methyl group roughly becomes as follows. That is, mmmr: 21.5 to 21.7 ppm, rmmr: 21.3 to 21.5 ppm, mmrr: 21.0 to 21.1 ppm, mmrm and rmrr: 20.8 to 21.0 ppm, rmrm: 20.6 to 20.8 ppm, rrrr: 20.3 to 20.5 ppm, rrrm: 20.1 to 20.3 ppm and mrrm: 19.9 to 20.1 ppm. In this connection, it is necessary to carry out the assignment by taking into consideration that chemical shifts of peaks originated from these pentads slightly vary depending on the NMR measuring conditions and that each peak is not always a single peak but shows a complex split pattern in many cases based on the fine structure.

Regarding the propylene polymer main chain of the invention, it is desirable that when chemical shift of the peak top of a peak assigned for a pentad represented by mmmm is defined as 21.8 ppm, the ratio ($S_1/S$) of area $S_1$ of a peak having a peak top of 21.8 ppm to the total area S of peaks of the pentads appeared within the range of from 19.8 ppm to 22.2 ppm, namely peaks assigned for all pentads of mmmm, mmmr, rmmr, mmrr, mmrm, rmrr, rmrm, rrrr, rrrm and mrrm, is 10% or more and 60% or less, and that when area of a peak having a peak top of 21.5 to 21.7 ppm (mmmr) is defined as $S_2$, $4+2S_1/S_2>5$.

According to a preferred propylene polymer main chain of the invention, ratio of the area of a peak assigned for a specified pentad to the total area (S) of peaks of the all pentads appeared within 19.8 ppm to 22.2 ppm satisfies the following requirements (1) to (4). In this case, % represents ratio of the area of a peak assigned for a specified pentad to the total area of peaks of the all pentads appeared within 19.8 ppm to 22.2 ppm.

(1) When area of a peak having a peak top of 20.3 to 20.5 ppm (rrrr) is defined as $S_3$, ratio of the area $S_3$ ($S_3/S$) is 0.2% or more and 3% or less, (2) when area of a peak having a peak top of 20.6 to 20.8 ppm (rmrm) is defined as $S_4$, ratio of the area $S_4$ ($S_4/S$) is 0.3% or more and 7% or less, (3) the area of $S_4$ is larger than the area of $S_3$, and (4) the area of $S_2$ is $25>4+2S_1/S_2>5$.

A more preferred propylene polymer main chain satisfies the following requirements (1) to (4) (wherein S and $S_1$ to $S_4$ are as defined in the foregoing).

(1) Ratio of the area $S_1$ ($S_1/S$) is 30% or more and 50% or less, (2) ratio of the area $S_3$ ($S_3/S$) is 1% or more and 3% or less, (3) ratio of the area $S_4$ ($S_4/S$) is 4% or more and 7% or less, (4) the area of $S_2$ is $10>4+2S_1/S_2>7$.

Among these requirements, each of the requirements (1) to (3) is related to the facts that a block having high crystallinity and a block having high amorphous property are present in the propylene polymer main chain of the invention, and that the block having high crystallinity is in a structure rich in isotactic property. In this connection, when the ratio of $S_1$ to S is less than 10%, it is not desirable because sufficient adhesiveness cannot be obtained due to too low crystallinity and it is apt to cause problems such as stickiness. On the other hand, when the ratio of $S_1$ to S exceeds 60%, it also is not desirable because solubility in a solvent is reduced due to too high crystallinity. Range of the ratio of $S_1$ to S defined in the invention is 10% or more and 60% or less, but is preferably 20% or more and 50% or less and more preferably 30% or more and 50% or less.

It is desirable that the propylene polymer main chain of the invention satisfies the relationship of $4+2S_1/S_2>5$. This relational expression has a close relation to an index named by Waymouth et al. as isotactic block index (BI) (cf. Unexamined International Patent Publication No. 510745/1997). The BI is an index showing stereo-block property of polymers and defined by BI=4+2 [mmmm]/[mmmr]. More illustratively, BI represents average chain length of an isotactic block having 4 or more propylene units (J. W. Collete et al., *Macromol.*, 22, 3858 (1989); J. C. Randall, *J. Polym. Sci. Polym. Phys. Ed.*, 14, 2083 (1976)). In the case of a statistically complete atactic polypropylene, it becomes BI=5. Accordingly, BI=4+2 [mmmm]/[mmmr]>5 means that average chain length of isotactic block is longer than that of atactic polypropylene.

The formula $4+2S_1/S_2$ as a requirement of the propylene polymer main chain of the invention is not completely identical to the BI but roughly corresponds thereto, so that the requirement $4+2S_1/S_2>5$ means that, different from atactic polypropylene, main chain of the propylene polymer of the invention contains an isotactic block having a crystallizable chain length. Also, the presence of an isotactic block means in other words that a block comprising a sequence having turbulent stereospecificity is simultaneously present in the main chain. Thus, as described in the foregoing, the propylene polymer main chain of the invention has a unique structure in which a block having high crystallinity and a block having high amorphous property are present in the main chain, and the block having high crystallinity is formed from an isotactic block having a relatively long average chain length so that it is in a structure rich in isotactic property.

According to the invention, it may be $5<4+2S_1/S_2$, but is preferably $5<4+2S_1/S_2<25$, more preferably $7<4+2S_1/S_2<10$.

In addition, since the propylene polymer main chain of the invention has suitable stereoregularity distribution of methyl group in the polymer main chain, it has a characteristic in that it has good solubility in a solvent because its crystallinity is also relatively low. Illustratively, it is a characteristic that substantially all components are eluted at 60° C. or less when the polymer main chain is subjected to temperature rising elution fractionation with o-dichlorobenzene. Since the components eluted at a temperature of higher than 60° C. are components having markedly high crystallinity, in case that the polymer main chain contains such components, it is apt to cause inconveniences when the polymer main chain is dissolved in a solvent, such as formation of insoluble matter from such components having high crystallinity and generation of gelation. Since substantially all components of the propylene polymer main chain of the invention are eluted at 60° C. or less, such inconveniences can be avoided, but it is desirable that substantially all components are eluted at preferably 50° C. or less, more preferably at 40° C. or less.

The propylene polymer main chain of the invention is obtained by a method in which it is polymerized using a single site catalyst. Examples of the reason for this include that microtacticity can be controlled by designing the ligand, a polymer having relatively low molecular weight can be easily produced and particularly molecular weight distribution and stereoregularity distribution of the polymer are sharp. When molecular weight distribution and stereoregularity distribution are irregular, there is a possibility that insoluble matter is partially formed due to difference in solubility. Among single site catalysts, a metallocene catalyst is suitably used from the viewpoint that it can precisely control microtacticity.

As the single site catalyst for use in the production of the propylene polymer main chain of the invention, a metallocene catalyst containing a metallocene compound ([A] component) and a co-catalyst ([B] component) as essential components is desirably used.

As the metallocene compound ([A] component), a $C_1$-symmetric ansa-metallocene having a transition metal-containing bridge group is desirable. Though a non-bridge metallocene can also be applied to the production of the propylene polymer of the invention, an ansa-metallocene having a bridge group is generally desirable particularly from the industrial point of view because of its excellent properties such as heat stability.

The ansa-metallocene to be used in the invention having a transition metal-containing bridge group is a $C_1$-symmetric metallocene of a crosslinked group IV transition metal compound having a conjugated five-membered ring ligand. Such a transition metal compound is well known, and it is known that this is used as an α-olefin polymerization catalyst component.

The metallocene of [A] component desirably used for the production of propylene polymer is a compound represented by the following general formula (I) and having $C_1$-symmetry. Also, two or more metallocene compounds represented by this general formula may be used as a mixture.

The metallocene having this general formula is described in detail in the following.

In the general formula (I), Q represents a binding group which bridges between two conjugated five-membered ring ligands, M represents a group IV transition metal of the periodic table, X and Y each independently represents hydrogen, a halogen, a hydrocarbon group having from 1 to 20 carbon atoms, an oxygen-containing hydrocarbon group having from 1 to 20 carbon atoms, a nitrogen-containing hydrocarbon group having from 1 to 20 carbon atoms, a phosphorus-containing hydrocarbon group having from 1 to 20 carbon atoms or a silicon-containing hydrocarbon group having from 1 to 20 carbon atoms, and $R^2$ and $R^3$ each independently represents a hydrocarbon group having from 1 to 20 carbon atoms, a halogen, a halogen-containing hydrocarbon group having from 1 to 20 carbon atoms, an alkoxy group, an aryloxy group, a silicon-containing hydrocarbon group, a phosphorus-containing hydrocarbon group, a nitrogen-containing hydrocarbon group or a boron-containing hydrocarbon group. Also, adjacent two $R^2$ and/or $R^3$ may be respectively bonded to form a four- to ten-membered ring. The symbols a and b are each independently an integer which satisfies $0 \leq a \leq 4$ or $0 \leq b \leq 4$.

As the binding group Q which bridges between two conjugated five-membered ring ligands, the following can be cited as illustrative examples. That is, alkylene groups such as methylene and ethylene, alkylidene groups such as ethylidene, propylidene, isopropylidene, phenylmethylidene and diphenylmethylidene, silicon-containing bridge groups such as dimethylsilylene, diethylsilylene, dipropylsilylene, diphenylsilylene, methylethylsilylene, methylphenylsilylene, methyl-t-butylsilylene, disilylene and tetramethyldisilylene and germanium-containing bridge groups such as dimethylgermilene, diethylgermilene, diphenylgermilene and methylphenylgermilene, as well as alkylphosphines and amines. Among them, alkylene groups, alkylidene groups, silicon-containing bridge groups and germanium-containing bridge groups are particularly desirably used.

Illustrative examples of $R^2$ and $R^3$ in the general formula (I) include hydrocarbon groups having from 1 to 20 carbon atoms which may be substituted, such as methyl, ethyl, n-propyl, isopropyl, n-butyl, isobutyl, t-butyl, n-pentyl, isopentyl, cyclopentyl, hexyl, cyclohexyl, heptyl, octyl, nonyl, decyl, phenyl, t-butylphenyl and naphthyl, hydrocarbon groups having from 1 to 20 carbon atoms which may contain halogen, such as fluoromethyl, fluoroethyl, fluorophenyl, fluoronaphthyl, fluorobiphenyl, chloromethyl, chloroethyl, chlorophenyl, chloronaphthyl and chlorobiphenyl, halogen atoms such as fluorine, chlorine, bromine and iodine, alkoxy groups such as methoxy, ethoxy, propoxy and butoxy, aryloxy groups such as phenoxy, methylphenoxy and pentamethylphenoxy, silicon-containing hydrocarbon groups such as trimethylsilyl, triethylsilyl and triphenylsilyl, phosphorus-containing hydrocarbon groups, nitrogen-containing hydrocarbon groups and boron-containing hydrocarbon groups. When two or more of $R^2$ are present, they may be the same or different from one another.

Also, when two of $R^2$ are present on adjacent carbon atoms of cyclopentadienyl ring, they may be mutually bonded to form a four- to ten-membered ring group such as indenyl, tetrahydroindenyl, fluorenyl, octahydrofluorenyl, azulenyl or hexahydroazulenyl. In the same manner, when two or more of $R^3$ are present, they may be the same or different from one another. In addition, when two of $R^3$ are present on adjacent carbon atoms of cyclopentadienyl ring, they may be mutually bonded to form a four- to ten-membered ring group such as indenyl, tetrahydroindenyl, fluorenyl, octahydrofluorenyl, azulenyl or hexahydroazulenyl.

According to the invention, the metallocene represented by the general formula (I), $Q(C_5H_{4-a}R^2_a)(C_5H_{4-b}R^3_b)MXY$, has $C_1$-symmetry, so that $R^2$ and $R^3$ may be the same or different from each other so far as the $C_1$-symmetry is maintained.

M is a group IV transition metal of the periodic table, which is illustratively titanium, zirconium or hafnium, preferably zirconium or hafnium.

X and Y are each independently hydrogen, a halogen, a hydrocarbon group having from 1 to 20, preferably from 1 to 10, carbon atoms, an alkoxy group having from 1 to 20, preferably from 1 to 10, carbon atoms, an alkylamido group, a phosphorus-containing hydrocarbon group having from 1 to 20, preferably from 1 to 12, carbon atoms or a silicon-containing hydrocarbon group having from 1 to 20, preferably from 1 to 12, carbon atoms. X and Y may be the same or different from each other. Among them, a halogen, a hydrocarbon group and an alkylamido group is desirable.

Among the metallocene compounds represented by the general formula (I), dichloro[dimethylsilylene-(cyclopentadienyl)(2,4-dimethyl-4H-1-azulenyl)]hafnium is most particularly desirable for the production of a propylene polymer main chain having characteristics of the invention, and dichloro[dimethylgermilene(cyclopentadienyl)(2,4-dimethyl-4H-1-azulenyl)]hafnium and dichloro[dimethylsilylene(2-methyl-1-indenyl)(2,4-dimethyl-4H-1-azulenyl)]hafnium are also suitable catalysts.

In this connection, regarding the [A] component metallocene compound, a mixture of two or more compounds having different structures may be used, or two or more compounds may be used in combination. In addition, a known solid catalyst containing titanium trichloride as the main component or a carrier-supporting type catalyst containing magnesium, titanium and halogen as essential components can be used as a auxiliary catalyst. Also, the [A] component may be used by again adding it at the time of the completion of the first stage polymerization or before commencement of the second stage polymerization.

As the co-catalyst ([B] component) to be used in the invention, one or more substances are used as essential components which are selected from the group consisting of (1) an organic aluminumoxy compound, (2) an ionic compound capable of exchanging the [A] component into cation by reacting with the transition metal of [A] component, (3) a Lewis acid and (4) an ion exchanging layer compound excluding silicate or an inorganic silicate.

As the organic aluminumoxy compound of (1), the compounds represented by the following general formulae (II), (III) and (IV) can be cited as illustrative examples.

In these general formulae, $R^4$ represents hydrogen atom or a hydrocarbon residue, preferably a hydrocarbon residue having from 1 to 10, more preferably from 1 to 6, carbon atoms. Also, two or more of $R^4$ may be the same or different from one another. Also, p is an integer of from 0 to 40, preferably from 2 to 30.

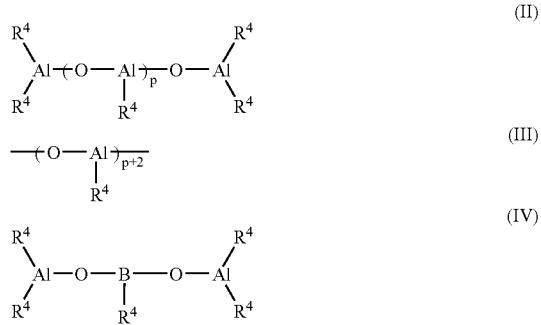

The compounds represented by the general formulae (II) and (III) are a compound called aluminoxane which is obtained by the reaction of one species of trialkylaluminum or two or more species of trialkylaluminum with water. Its illustrative examples include (a) methylaluminoxane, ethylaluminoxane, propylaluminoxane, butylaluminoxane, and isobutylaluminoxane obtained from one trialkylaluminum species and water and (b) methylethylaluminoxane, methylbutylaluminoxane and methylisobutylaluminoxane obtained from two trialkylaluminum species and water. Preferred among them are methylaluminoxane and methylisobutylaluminoxane. It is possible to use the aluminoxane in combination of two or more species. Also, the aluminoxane can be prepared under various known conditions.

The compound represented by the general formula (IV) can be obtained by a 10:1 to 1:1 (molar ratio) reaction of one species of trialkylaluminum or two or more species of trialkylaluminum with an alkylboronic acid represented by the following general formula (V). In the general formula (V), $R^5$ represents a hydrocarbon residue having from 1 to 10, preferably from 1 to 6, carbon atoms or a halogenated hydrocarbon group.

$$R^5—B(OH)_2 \qquad (V)$$

Its illustrative examples include the following reaction products, namely, (a) a 2:1 reaction product of trimethylaluminum with methylboronic acid, (b) a 2:1 reaction product of triisobutylaluminum with methylboronic acid, (c) a 1:1:1 reaction product of trimethylaluminum and triisobutylaluminum with methylboronic acid, (d) a 2:1 reaction product of trimethylaluminum with ethylboronic acid and (e) a 2:1 reaction product of triethylaluminum with butylboronic acid.

Also, as the (2) ionic compound capable of exchanging the [A] component into cation by reacting with the transition metal of [A] component, the compounds represented by a general formula (VI) can be exemplified.

$$[K]^{n+}[Z]^{n-} \qquad [VI]$$

In the general formula (VI), K is a cationic component and its examples include carbonium cation, tropylim cation, ammonium cation, oxonium cation, sulfonium cation and phosphonium cation. Also included are cation of a metal and cation of an organic metal, which by themselves are apt to be reduced.

Illustrative examples of the cation include triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tris(dimethylphenyl)phosphonium, tris(methylphenyl)phosphonium, triphenylsulfonium, triphenyloxonium, triethylbxonium, pyrylium, silver ion, gold ion, platinum ion, copper ion, palladium ion, mercury ion and ferrocenium ion.

In the general formula (VI), Z is an anion component which is a component that becomes counter-anion for a cation species converted from the [A] component transition metal (generally a non-coordination component). As Z, an organic boron compound anion, an organic aluminum compound anion, an organic gallium compound anion, an organic arsenic compound anion and an organic antimony compound anion can be exemplified, and the following compounds can be cited as illustrative examples. That is, (a) tetraphenylboron, tetrakis(3,4,5-trifluorophenyl)boron, tetrakis{3,5-bis(trifluoromethyl)phenyl}boron, tetrakis-{3,5-di(t-butyl)phenyl}boron and tetrakis(pentafluorophenyl)boron and (b) tetraphenylaluminum, tetrakis(3,4,5-trifluorophenyl)aluminum, tetrakis{3,5-bis(trifluoromethyl)phenyl}aluminum, tetrakis{3,5-di(t-butyl)-phenyl}aluminum and tetrakis(pentafluorophenyl) aluminum can be exemplified.

Other illustrative examples include (c) tetraphenylgallium, tetrakis(3,4,5-trifluorophenyl)gallium, tetrakis{3,5-bis(trifluoromethyl)phenyl}gallium, tetrakis-{3,5-di(t-butyl)phenyl}gallium and tetrakis-(pentafluorophenyl)gallium, (d) tetraphenylphosphorus and tetrakis(pentafluorophenyl)phosphorus, (e) tetraphenyl-arsenic and tetrakis(pentafluorophenyl)arsenic, (f) tetraphenylantimony and tetrakis(pentafluorophenyl)-antimony and (g) decaborate, undecaborate, carbadodecaborate and decachlorodecaborate.

Also, as the (3) Lewis acid, particularly a Lewis acid capable of converting the [A] component transition metal into cation, various organic boron compounds, metal halide compounds and solid acids can be exemplified, and the following compounds can be cited as their illustrative examples. That is, (a) organic boron compounds such as triphenylboron, tris(3,5-difluorophenyl)boron and tris(pentafluorophenyl)boron, (b) metal halide compounds such as aluminum chloride, aluminum bromide, aluminum iodide, magnesium chloride, magnesium bromide, magnesium iodide magnesium chloride bromide, magnesium chloride iodide, magnesium bromide iodide, magnesium chloride hydride, magnesium chloride hydroxide, magnesium bromide hydroxide, magnesium chloride alkoxide and magnesium bromide alkoxide and (c) solid acids such as alumina and silica-alumina can be exemplified.

The (4) ion exchanging layer compound excluding silicate is a compound which forms a crystal structure in which planes constituted by a bond such as ionic bond are mutually piled up in parallel through a weak binding power, wherein the contained ion can be exchanged.

As the ion exchanging layer compound excluding silicate, ionic crystalline compounds having layer crystal structures such as of hexagonal closest packing type, antimony type, $CdCl_2$ type and $CdI_2$ type can be exemplified.

Illustratively, crystalline acidic salts of polyvalent metals, such as $\alpha$-$Zr(HAsO_4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HAsO_4)_2 \cdot H_2O$, $\alpha$-$Sn(HPO_4)_2 \cdot H_2O$, $\gamma$-$Zr(HPO_4)_2$, $\gamma$-$Ti(HPO_4)_2$ and $\gamma$-$Ti(NH_4PO_4)_2 \cdot H_2O$, can be cited.

Also, as the inorganic silicate, clay, clay mineral, zeolite and diatomaceous earth can be exemplified. These may be synthesized products or naturally produced minerals.

Illustrative examples of the clay and clay mineral include allophane groups such as allophane, kaolin groups such as dickite, nacrite, kaolinite and anorthite, halloysite groups such as metahalloysite and halloysite, serpentine groups such as chrysotile, lizardite and antigorite, smectites such as montmorillonite, zauconite, beidellite, nontronite, saponite and hectorite, vermiculite minerals such as vermiculite, mica minerals such as illite, sericite and glauconite, attapulgite, sepiolite, paygorskite, bentonite, kibushi clay, gairome clay, hisingerite, pyrophyllite and chlorite groups. These may form mixed layers.

As the artificially synthesized products, synthetic mica, synthetic hectorite, synthetic saponite and synthetic taeniolite can be exemplified.

Preferred among these illustrative examples are kaolin groups such as dickite, nacrite, kaolinite and anorthite, halloysite groups such as metahalloysite and halloysite, serpentine groups such as chrysotile, lizaldite and antigorite, smectites such as montmorillonite, zauconite, beidellite, nontronite, saponite and hectorite, vermiculite minerals such as vermiculite, mica minerals such as illite, sericite and glauconite, synthetic mica, synthetic hectorite, synthetic saponite and synthetic taeniolite, and particularly preferred are smectites such as montmorillonite, zauconite, beidellite, nontronite, saponite and hectorite, vermiculite minerals such as vermiculite, and synthetic mica, synthetic hectorite, synthetic saponite and synthetic taeniolite.

These ion exchanging layer compounds excluding silicate or inorganic silicates may be used as such, but it is desirable to carry out a treatment with an acid such as hydrochloric acid, nitric acid or sulfuric acid and/or a treatment with a salt such as LiCl, NaCl, KCl, $CaCl_2$, $MgCl_2$, $Li_2SO_4$, $MgSO_4$, $ZnSO_4$, $Ti(SO_4)_2$, $Zr(SO_4)_2$ or $Al_2(SO_4)_3$. In this case, the treatment may be carried out by mixing corresponding acid and base to form a salt in the reaction system. Also, a shape control such as pulverization or granulation may be carried out, and it is desirable to carry out granulation for the purpose of obtaining a solid catalyst component having excellent particle fluidity. In addition, this component is used generally after dehydration drying. As an essential component of these [B] components, it is desirable to use (4) an ion exchanging layer compound excluding silicate or an inorganic silicate in view of catalyst performance such as polymerization activity.

In producing the propylene polymer main chain of the invention, an organic aluminum compound may be used as an optional component [C], in addition to the co-catalyst [B] component. The organic aluminum compound is a compound represented by a general formula $AlR^1{}_m Z_{s-m}$ (wherein $R^1$ is a hydrocarbon group having from 1 to 20 carbon atoms, Z is hydrogen, a halogen, an alkoxy group or an aryloxy group, and m is a number of $0 < m \leq 3$). Illustratively, it is a trialkylaluminum such as trimethylalminum, triethylaluminum, tripropylaluminum or triisobutylaluminum, a halogen- or alkoxy-containing alkylaluminum such as diethylalminum monochloride or diethylalminum ethoxide, or a hydrogen-containing organic aluminum compound such as diethylaluminum hydride or diisobutylaluminum hydride. In addition to this, an aluminoxane such as methylaluminoxane can also be used. Particularly preferred among them is a trialkylaluminum. These optional components may be used in combination of two or more. Also, the optional component [C] may be again added, e.g., after commencement of the polymerization.

The catalyst for propylene polymerization use is obtained through the contact of the [A] component, [B] component and [C] component, but the contacting method is not particularly limited. This contact may be carried out not only at the time of the catalyst preparation but also at the time of the preliminary polymerization or polymerization of propylene.

The propylene polymer and solid of an inorganic oxide such as silica or alumina may be allowed to coexist or contact at the time of the contact of respective catalyst component or after the contact.

The contact may be carried out in an inert gas such as nitrogen or in an inert hydrocarbon solvent such as n-pentane, n-hexane, n-heptane, toluene or xylene. It is desirable to use these solvents after applying them to an operation for removing poisoning substances such as water and sulfur compounds. It is desirable to carry out the contact at a temperature of from −20° C. to boiling point of the solvent to be used, particularly from room temperature to boiling point of the solvent to be used.

Amount of each of the catalyst components is not particularly limited, but when an ion exchanging layer compound excluding silicate or an inorganic silicate is used as the [B] component, the [A] component is from 0.0001 to 10 mmol, preferably from 0.001 to 5 mmol, and the [C] component is from 0 to 10,000 mmol, preferably from 0.01 to 100 mmol, based on 1 g of the [B] component. Also; in view, e.g., of polymerization activity, it is desirable to control atomic ratio of the transition metal in the [A] component and aluminum in the [C] component at a level of from 1:0 to 1,000,000, preferably from 1:0.1 to 100,000.

The catalyst obtained in this manner may be used after washing with an inert hydrocarbon solvent such as n-pentane, n-hexane, n-heptane, toluene or xylene, or without washing.

In carrying out the washing, the [C] component may be again used in combination as occasion demands. In that case, it is desirable to control the [C] component to be used at such an amount that atomic ratio of aluminum in the [C] component to the transition metal in the [A] component becomes from 1:0 to 10,000.

A product obtained by preliminarily polymerizing propylene and washing it as occasion demands can also be used as the catalyst. This preliminary polymerization may be carried out in an inert gas such as nitrogen using an inert hydrocarbon solvent such as pentane, hexane, heptane, toluene or xylene.

The polymerization reaction of propylene is carried out in the presence or absence of the liquid of an inert hydrocarbon such as propane, n-butane, n-hexane, n-heptane, toluene, xylene, cyclohexane or methylcyclohexane or liquid of liquefied propylene. Particularly, it is desirable to carry out the polymerization in the presence of the inert hydrocarbon.

Illustratively, the propylene polymer main chain is produced in the presence of the [A] component and [B] component or the [A] component, [B] component and [C] component. The polymerization temperature, polymerization pressure and polymerization time are not particularly limited, but optimum setting can be carried out from the following ranges by taking productivity and process capacity into consideration. That is, the polymerization temperature is selected from the range of generally from 0 to 150° C., preferably from 20 to 100° C., the polymerization pressure from 0.1 MPa to 100 MPa, preferably from 0.3 MPa to 10 MPa, more preferably from 0.5 MPa to 4 MPa, and the polymerization time from 0.1 hour to 10 hours, preferably from 0.3 hour to 7 hours, more preferably from 0.5 hour to 6 hours.

According to the invention, it is desirable to control weight average molecular weight Mw of the polymer within the range of from 5,000 to 200,000 as described above. For this purpose, conventionally known methods can be used in controlling molecular weight of the polymer. That is, a method in which the molecular weight is controlled by regulating the polymerization temperature, a method in which the molecular weight is controlled by regulating the monomer concentration and a method in which the molecular weight is controlled by using a chain transfer agent can be exemplified. When a chain transfer agent is used, hydrogen is desirable.

Also, regarding the propylene polymer main chain of the invention produced by controlling stereoregularity of the propylene unit chain region comprising a head to tail bond, it is desirable that, when peaks originated from the carbon atom of methyl group in a propylene unit chain region comprising a head to tail bond are measured by $^{13}$C-NMR as described in the foregoing and when chemical shift of the peak top of a peak assigned for a pentad represented by mmmm is defined as 21.8 ppm, ratio of area $S_1$ of a peak having a peak top of 21.8 ppm to the total area S of peaks found at from 19.8 ppm to 22.2 ppm ($S_1/S$) is 10% or more and 60% or less, and when area of a peak having a peak top of 21.5 to 21.7 ppm (mmmr) is defined as $S_2$, $4+2S_1/S_2>5$.

Method for controlling the stereoregularity related to such characteristics of the propylene polymer main chain is not particularly limited, but generally, a method in which it is controlled by the structure of catalyst and a method in which it is controlled by regulating polymerization condition can be exemplified. When the stereoregularity is controlled by regulating polymerization conditions, a propylene polymer main chain having desired stereoregularity can be obtained by regulating polymerization temperature and monomer concentration and, if necessary, by jointly regulating the catalyst structure.

The propylene polymer main chain to be used in the invention can be dissolved in a solvent. Illustrative examples of the solvent include aromatic hydrocarbons such as benzene, toluene and xylene; aliphatic hydrocarbons such as n-pentane, n-hexane, n-heptane, n-octane and n-decane; alicyclic aliphatic hydrocarbons such as cyclohexane, methylcyclohexane and dimethylcyclohexane; halogenated hydrocarbons such as methylene chloride, carbon tetrachloride, trichloroethylene, perchloroethylene, chlorobenzene and o-dichlorobenzene; esters such as n-ethyl acetate and n-butyl acetate; ketones such as methyl isobutyl ketone and cyclohexanone; and polar solvents such as tetrahydrofuran and dimethyl sulfoxide; of which aromatic hydrocarbons or halogenated hydrocarbons are preferred, and toluene, xylene and chlorobenzene are particularly preferred.

Its solubility is markedly high in comparison with conventional modified isotactic polypropylene having high stereoregularity, and when dissolved in toluene at room temperature (25° C.) to a concentration of 10% by weight, the insoluble matter is 1% by weight or less of the total amount of the polymer. The content is preferably 0.1% by weight and practically no insoluble matter is more preferable. In the same manner, when dissolved in boiling heptane (98° C.) to a concentration of 10% by weight, the insoluble matter is 1% by weight or less of the total amount of the polymer.

As the measuring method, a method is used in which a solution dissolved at a predetermined temperature in a predetermined concentration is filtered at around the temperature (filtration at the time of heating when the temperature is high), and the weight of insoluble matter is measured by drying the filter paper or stainless-steel screen used therein.

The method for producing a propylene polymer which has a main chain comprising the propylene polymer of the invention and a side chain containing a carboxylic acid group, an acid anhydride group or a carboxylic acid ester group is not particularly limited, but it is general to use a method in which the polymer is obtained by graft-polymerizing a polymerizable monomer containing a carboxylic acid or a derivative thereof to the propylene polymer main chain. As the polymerizable monomer containing a carboxylic acid or a derivative thereof to be subjected to the graft polymerization, (meth)acrylic acid and a derivative thereof and a monoolefin dicarboxylic acid, an anhydride thereof and monoesters thereof can be exemplified, and at least one species selected therefrom is used. Illustrative examples of the (meth)acrylic acid and a derivative thereof include (meth)acrylic acid; a (meth)acrylic acid ester monomer having an alkyl group of from 1 to 12 carbon atoms, such as methyl(meth)acrylate, ethyl(meth)acrylate, n-propyl(meth) acrylate, isopropyl(meth)acrylate, n-butyl(meth)acrylate, isobutyl(meth)acrylate, t-butyl(meth)acrylate, pentyl(meth) acrylate, hexyl(meth)acrylate, cyclohexyl(meth)acrylate, octyl(meth)acrylate, 2-ethylhexyl(meth)acrylate, nonyl (meth)acrylate, decyl(meth)acrylate or dodecyl(meth)acrylate; and a (meth)acrylic acid ester monomer having an aryl or arylalkyl group of from 6 to 12 carbon atoms, such as phenyl(meth)acrylate, tolyl(meth)acrylate or benzyl(meth) acrylate.

Other examples of the (meth)acrylic acid derivative include a hetero atom-containing (meth)acrylic acid ester monomer having an alkyl group of from 1 to 20 carbon atoms, such as hydroxyethyl(meth)acrylate, dimethylaminoethyl(meth)acrylate, diethylaminoethyl(meth)acrylate, 2-aminoethyl(meth)acrylate, 2-methoxyethyl(meth)acrylate, 3-methoxypropyl(meth)acrylate, glycidyl(meth)acrylate or (meth)acrylic acid ethylene oxide addition product; a fluorine atom-containing (meth)acrylic acid ester monomer having an alkyl group of from 1 to 20 carbon atoms, such as trifluoromethylmethyl(meth)acrylate, 2-trifluoromethylethyl(meth)acrylate or 2-perfluoroethylethyl(meth)acrylate; and a (meth)acrylamide monomer such as (meth)acrylamide or (meth)acryldimethylamide.

A monoolefin dicarboxylic acid and an anhydride thereof and a monoalkyl ester of a monoolefin dicarboxylic acid can also be exemplified, and examples of the monoolefin dicarboxylic acid include maleic acid, chloromaleic acid, citraconic acid, itaconic acid, glutaconic acid, 3-methyl-2-pentene diacid, 2-methyl-2-pentene diacid and 2-hexene diacid. Also, as the monoolefin dicarboxylic acid monoalkyl ester, an alkyl alcohol having from 1 to 12 carbon atoms and its monoester with a dicarboxylic acid can be exemplified, and illustrative examples of the alkyl alcohol include methyl alcohol, ethyl alcohol, propyl alcohol, butyl alcohol, pentyl alcohol, octyl alcohol and cyclohexyl alcohol.

When a coating layer is formed using the graft modified propylene polymer of the invention, those which have high solubility parameter are desirable as the polymerizable monomers containing these carboxylic acids or derivatives thereof to be grafted from the viewpoint of the adhesiveness between the coating layer and a paint, that is, unsaturated carboxylic acid derivative components comprising an unsaturated carboxylic acid having from 3 to 10 carbon atoms, an acid anhydride thereof and an ester thereof is desirable, and maleic anhydride is particularly desirable.

Among graft modified propylene polymers of the invention, a modified polymer having a monoolefin dicarboxylic acid monoalkyl ester as the graft copolymerization unit can be obtained, e.g., by a method in which a monoolefin dicarboxylic acid monoalkyl ester is graft-copolymerized to the propylene polymer main chain; or a method in which a monoolefin dicarboxylic acid or an acid anhydride thereof is graft-copolymerized to the propylene polymer main chain and then one of the carboxylic acid groups is esterified by an alkyl alcohol.

It is desirable to carry out the graft copolymerization in such a manner that the grafted amount of at least one graft copolymerization unit selected from the polymerizable monomers containing a carboxylic acid group or a derivative thereof in the graft modified propylene polymer, namely its content (graft ratio) in the propylene polymer, becomes from 0.01 to 25% by weight, preferably from 0.1 to 15% by weight. A propylene polymer having the graft ratio within this range is preferable from the viewpoint that, when this is coated as a primer on a molded product, a coating layer having high adhesiveness of a paint is obtained, adhesiveness between the coating layer and molded product becomes also good and the appearance becomes good.

In addition, as will be described later, the propylene polymer of the invention shows superior solubility, namely, when it is dissolved in toluene to a concentration of 10% by weight at 25° C., the insoluble matter is 1% by weight or less based on the total polymer, and in addition to this, it also has high adhesiveness to a polypropylene molded body to be used as the base material. That is, the propylene polymer of the invention is excellent in the adhesiveness to a polypropylene molded body, and its adhesiveness measured by an adhesion test (cross-cut tape method) is 50/100 or more, preferably 80/100 or more, and more preferably 100/100. Particularly, as a propylene polymer having such excellent characteristics, those in which a polymerizable monomer containing a carboxylic acid group or a derivative thereof is graft-copolymerized to the propylene polymer main chain can be exemplified.

According to the invention, adhesiveness of propylene polymers is measured by the following adhesion test.

Adhesion Test (A) The adhesion test is carried out in accordance with the cross-cut tape method described in JIS K5400 8.5.2.

(1) Summary

Cuts penetrating the coating layer of a test piece and reaching the base material face are applied in a cross-cut shape, an adhesive tape is adhered on the cross-cuts, and adhered condition of the coating layer after peeling is observed with the naked eye.

(2) Tools and Materials (a) Cutter knife: Defined by JIS K5400 7.2(2) (e).

(b) Cutter guide: Defined by JIS K5400 8.5.1(2) (b).

(c) Cellophane adhesive tape: A cellophane adhesive tape defined by JIS Z1522, having a width of 18 mm or 24 mm and an adhesive strength of 2.94 N/10 mm or more.

(d) Test plate: A polypropylene test piece (150 mm×70 mm×3 mm).

(e) Eraser: Defined by JIS S6050.

(3) Preparation of Test Piece

A sample is coated and dried on one side of a test piece by a method defined by JIS K5400 3.3 for a product standard of samples, and then allowed to stand for 24 hours under the standard condition.

(4) Operation

In accordance with JIS K5400 8.5.2. (4).

(5) Evaluation

The evaluation is carried out as follows.

(a) Conditions of the cross-cut shaped cuts applied to the coating layer of test piece are observed, and the number of un-peeled cross-cuts among 100 cross-cuts is counted and expressed as "the number of residual cross-cuts/100" to be used as the adhesiveness.

A crystalline polypropylene is used as the polypropylene base material to be used in the adhesion test of the invention. Examples of the crystalline polypropylene include a propylene homopolymer, and/or a propylene-ethylene block copolymer having a propylene homopolymer moiety and a propylene-ethylene copolymer moiety. Among them, it is desirable to use a propylene homopolymer having an MFR (230° C., 21.18 N loading) of from 5 to 30 (g/10 min).

Various known methods can be exemplified as the method for graft-copolymerizing a polymerizable monomer such as a monoolefin dicarboxylic acid, an acid anhydride thereof or a monoolefin dicarboxylic acid monoalkyl ester to the propylene polymer main chain. For example, a method in which the graft copolymerization reaction is carried out by dissolving the propylene polymer main chain in an organic solvent, adding the polymerizable monomer to be grafted and a radical polymerization initiator and then stirring the mixture under heating; a method in which the graft copolymerization is effected by melting the propylene polymer main chain with heating, adding the polymerizable monomer to be grafted and a radical polymerization initiator to the melt and then stirring the mixture; a method in which the graft copolymerization is effected by feeding respective components into an extruder and heat-kneading them; and a method in which the graft copolymerization is effected by impregnating powder of the propylene polymer with a solution prepared by dissolving the polymerizable monomer to be grafted and a radical polymerization initiator in an organic solvent, and then heating at a temperature by which the powder is not dissolved can be cited.

In this case, the using ratio of radical polymerization initiator/polymerizable monomer to be grafted is within the range of generally from 1/100 to 3/5, preferably from 1/20 to 1/2, as a molar ratio.

The reaction temperature is 50° C. or more, particularly desirably within the range of from 80 to 200° C., and the reaction time is approximately from 2 to 10 hours.

The radical polymerization initiator to be used in the graft copolymerization can be used by optionally selecting from general radical initiators such as an organic peroxide and an azonitrile. Examples of the organic peroxide include diisopropyl peroxide, di(t-butyl) peroxide, t-butyl hydroperoxide, benzoyl peroxide, dicumyl peroxide, cumyl hydroperoxide, dilauroyl peroxide, dibenzoyl peroxide, methyl ethyl ketone peroxide, cyclohexanone peroxide, cumene hydroperoxide, diisopropyl peroxycarbonate and dicyclohexyl peroxycarbonate. Examples of the azonitrile include azobisbutyronitrile and azobisisopropylnitrile. Among them, benzoyl peroxide and dicumyl peroxide are preferred.

When the graft copolymerization reaction is carried out using an organic solvent, illustrative examples of the organic solvent include aromatic hydrocarbons such as benzene, toluene and xylene; aliphatic hydrocarbons such as hexane, heptane, octane and decane; and halogenated hydrocarbons such as trichloroethylene, perchloroethylene, chlorobenzene and o-dichlorobenzene, of which an aromatic hydrocarbon or a halogenated hydrocarbon is preferred, and toluene, xylene and chlorobenzene are particularly preferred.

The propylene polymer of the invention can also be dissolved in a similar solvent in which the propylene polymer main chain can be dissolved. Its solubility is markedly high in comparison with general isotactic polypropylene polymer having high stereoregularity, and when dissolved in toluene at 25° C. to a concentration of 10% by weight, the insoluble matter is 1% by weight or less of the total amount of the polymer. The content is preferably 0.1% by weight or less and practically no insoluble matter is more preferable. Also, since the propylene polymer of the invention is highly soluble in a solvent particularly having a solubility parameter of 11 $(cal/cm^3)^{1/2}$ or less, a composition prepared by dissolving 1 weight part or more of the graft modified propylene polymer in a solvent having a solubility parameter of 11 $(cal/cm^3)^{1/2}$ or less can be used as an adhesive composition.

Illustrative examples of the solvent having a solubility parameter of 11 $(cal/cm^3)^{1/2}$ or less include aromatic hydrocarbons such as benzene, toluene and xylene; aliphatic hydrocarbons such as n-pentane, n-hexane, n-heptane, n-octane and n-decane; alicyclic aliphatic hydrocarbons such as cyclohexane, methylcyclohexane and dimethylcyclohexane; halogenated hydrocarbons such as methylene chloride, chloroform, carbon tetrachloride, trichloroethylene, perchloroethylene, chlorobenzene and o-dichlorobenzene; esters such as n-methyl acetate, n-ethyl acetate and n-butyl acetate; ketones such as methyl isobutyl ketone and cyclohexanone; and ethers such as tetrahydrofuran; of which aromatic hydrocarbons or halogenated hydrocarbons are preferred, and toluene, xylene and chlorobenzene are particularly preferred.

Also, since the propylene polymer of the invention has suitable stereoregularity distribution of methyl group in the polymer main chain similar to the case of the propylene polymer main chain, it has a characteristic in that its crystallinity is also relatively low and it has good solubility in a solvent. Illustratively, it is a characteristic that substantially all components are eluted at 60° C. or less when the polymer is subjected to temperature rising elution fractionation with o-dichlorobenzene. Since the components eluted at a temperature of higher than 60° C. are components having markedly high crystallinity, in case that the polymer contains such components, it is apt to cause inconveniences when the polymer is dissolved in a solvent, such as formation of insoluble matter from such components having high crystallinity and generation of gelation. Since substantially all components of the propylene polymer of the invention are eluted at 60° C. or less, such inconveniences can be avoided, but it is desirable that substantially all components are eluted at preferably 50° C. or less, more preferably at 40° C. or less.

Since the propylene polymer of the invention is soluble in a solvent, it can be coated on a compact (base material) of an olefinic polymer having crystallinity. Examples of the olefinic polymer as the base material include olefinic polymers such as low density polyethylene, linear low density polyethylene, high density polyethylene, polypropylene, poly-4-methyl-1-pentene, poly-1-butene and polystyrene, and olefinic copolymers such as an ethylene-propylene copolymer, an ethylene-butene copolymer and a propylene-butene copolymer. Among these olefinic copolymers, a propylene copolymer is desirably used. Also, it can be used in moldings comprising polypropylene and synthetic rubber and moldings comprising a polyamide resin, an unsaturated polyester resin, a polybutylene terephthalate resin and a polycarbonate resin, e.g., moldings of automobile bumpers, and also in the surface finishing of steel sheets and steel sheet for electrodeposition. In addition, by under-coating it on a surface coated with a paint, primer or adhesive containing a polyurethane resin, a fatty acid modified polyester resin, an oil-free polyester resin, a melamine resin or epoxy resin as the main component, it can improve adhesive property of the paint and the others on the surface and also can be used in forming a coating layer having excellent properties such as brightness and low temperature impact.

Since the coating layer formed when the propylene polymer of the invention is coated on a base material comprising an olefinic polymer shows good adhesiveness to the base material as described in the foregoing, the propylene polymer of the invention can be used as an adhesive resin for olefinic polymers. In this connection, in order to obtain good adhesiveness for the olefinic polymer base material, it is desirable to carry out heating after the coating. Though the heating temperature is not particularly limited, it is preferably from 50 to 150° C., more preferably from 60 to 130° C., when actual use is taken into consideration. The coating method is not particularly limited too, and conventionally known methods such as spray coating, roller coating and brush coating can be used.

A paint can be coated on the surface of moldings having coating layers formed by coating the propylene polymer of the invention, by a method such as electrostatic coating, spray painting or brush coating.

Coating of a paint may be carried out by a method in which finish coating is carried out after under coating. After coating of a paint, moldings having desired coating layer on the surface can be obtained by curing the coating layer in accordance with a usual method for heating by electric heat, infrared ray or high frequency wave. The method for curing coating layer is optionally selected depending, e.g., on the material and shape of the moldings and properties of the paint to be used.

The composition prepared by dissolving the propylene polymer of the invention in a solvent can be used, e.g., as a primer for improving coating performance such as adhesive property of a paint on the surface, water resistance and gasoline resistance of moldings, by coating it on the surface of moldings comprising an α-olefin copolymer and other polymers as the main components. Also, making use of its excellent characteristics in terms of adhesive property, peel strength and water resistance, it can be used in a broad range of applications in addition to the use as a primer for moldings, and it is needless to say that it can be used in applications such as additive agents in adhesives and paints and ink binders.

Examples of the illustrative applications include a primer for automobile exterior (bumper) use, an adhesive for construction material and decorative sheet use, an adhesive for automobile parts, an adhesive for packing material use, a paint additive agent for automobile interior use and an ink binder for gravure ink use.

In addition, the composition of the invention may further contain various types of stabilizers such as an antioxidant, a weather stabilizer and a heat stabilizer, colorants such as titanium oxide and an organic pigment, and conductivity providing agents such as carbon black and ferrite.

Also, regarding the moldings to which the composition of the invention is to be applied, various polymers or resins described in the foregoing may be formed by any one of known forming methods such as injection molding, compression molding, blow molding, extrusion molding and rotational molding.

In coating a composition containing the propylene polymer of the invention on moldings, a coating layer having particularly good adhesive property can be formed also in case that the moldings are formulated with inorganic fillers and pigments such as talc, zinc oxide, glass fiber, titanium white and magnesium sulfate.

In addition, the moldings on which the propylene polymer of the invention is coated may further contain various components such as a stabilizer and an ultraviolet absorber.

Examples of the stabilizer to be preferably used in the composition of the invention include phenol base stabilizers such as 2,6-di-t-butyl-4-methylphenol, tetrakis[methylene (3,5-di-4-hydroxyhydrocinnamate)]methane, metaoctadecyl-3-(4'-hydroxy-3,5-di-t-butyl-phenyl)propionate, 2,2'-methylenebis(4-methyl-6-t-butyl-phenol), 4,4'-butylidenebis(3-methyl-6-t-butyl-phenol), 2,2-thiobis(4-methyl-6-t-butylphenol), 1,3,5-trimethyl-2,4,6-tris(3,5-di-t-butyl-4-hydroxybenzyl)benzene and 1,3,5-tris(2-methyl-4-hydroxy-5-t-butylphenol)butane; sulfur base stabilizers such as dilauryl thiodipropionate and distearyl thiodipropionate; and phosphorus base stabilizers such as tridecylphosphite and trinonylphenylphosphite.

Also, examples of the ultraviolet absorber include 2-hydroxy-4-octoxybenzophenone, 2-ethylhexyl-2-ciano-3,3-diphenyl acrylate and paraoctylphenyl salicylate.

The invention is described further illustratively in the following based on examples and comparative examples, but the invention is not restricted by these examples without departing the scope of the invention.

In this connection, measurement of physical properties and performance of polymers in the following examples and comparative examples was carried out in the following manner. Also, in each example, all of the catalyst preparation steps and polymerization steps were carried out under an atmosphere of purified nitrogen, and solvents were used by dehydrating with a molecular sieve (MS-4A) and then degassing by bubbling with purified nitrogen.

<Measurement of Physical Properties>

(i) Measurement of Physical Properties of Propylene Polymer Main Chain (1) Measurement of molecular weight of propylene polymer main chain Measurement of weight average molecular weight Mw, number average molecular weight Mn and molecular weight distribution Mw/Mn by GPC was carried out using GPC 150CV type manufactured by Waters. o-Dichlorobenzene was used as the solvent, and the measuring temperature was set to 135° C. In calculating molecular weight, a commercially available mono-dispersion polystyrene was used as the standard sample, and molecular weight was calculated by preparing a calibration curve regarding retention time and molecular weight from a viscosity formula of the polystyrene standard sample and polypropylene.

(2) Measurement of the pentads of propylene unit chain region by $^{13}$C-NMR spectrum was carried out in the following manner.

A 350 to 500 mg portion of a sample was completely dissolved using about 2.2 ml of o-dichlorobenzene in a 10 mm φ NMR sample tube. Next, this was homogenized by adding about 0.2 ml of benzene deuteride as a lock solvent, and then the measurement was carried out at 130° C. by a proton complete decoupling method. The measuring conditions were set to a flip angle of 90° and a pulse interval of $5T_1$ or more ($T_1$ is the longest value among spin-lattice relaxation times of methyl group). Since spin-lattice relaxation times of methylene group and methine group in propylene polymers are shorter than those of methyl group, recovery of magnetization of all carbons is 99% or more. In this connection, in order to improve determination accuracy, it is desirable to use an NMR apparatus of 125 MHz or more as the $^{13}$C nuclear resonance frequency and carry out integration of 20 hours or more.

(3) Crystallinity was measured by a wide angle X-ray diffractometry and determined by a multiple peak separation method (symmetric through transmission method (2θ/θ=5 to 60°, 0.1°/step)).

(4) Melting point Tm and crystal melting calorie were calculated by the following method using a thermal analysis system TA 2000 manufactured by Du Pont.

After melting a sample (about 5 to 10 mg) at 200° C. for 3 minutes, the temperature was reduced to 30° C. at a rate of 10° C./min and then increased to 200° C. at a rate of 10° C./min, thereby obtaining a melting curve, and the peak top temperature of the main endothermic peak at the final temperature rising step was obtained as the melting point.

(5) Temperature rising elution fractionation by o-dichlorobenzene was carried out using CFC-T-102L manufactured by Mitsubishi Chemical Corporation (described as 100% elution temperature, the elution fractionation was started at 5° C. and measured at 4 to 5° C. intervals).

(6) Solubility test was carried out by the following method.

Each propylene polymer was added to a solvent (heptane or toluene) to a concentration of 10% by weight, put into a separable flask equipped with a mixing blade and then dissolved by rising the outer temperature to 110° C. in the case of heptane or 120° C. in the case of toluene. After the inner temperature became constant, stirring was continued for 2 hours. This was allowed to stand for 1 hour just after the boiling temperature in the case of heptane, or after spontaneous cooling to 30° C. in the case of toluene, and then filtered through stainless-steel screen No. 400. The residue remained on the screen was regarded as insoluble matter, and the solution passed through the screen as soluble matter, and they were dried at 80° C. for 4 hours under 1 mmHg or less using a vacuum dryer. Ratio of the insoluble matter was measured by weighing them.

Evaluation Criteria

○: insoluble matter 1% or less, X: insoluble matter 1% or more (7) Non-tackiness was evaluated by a finger touch tackiness test.

○: excellent non-tackiness, Δ: slightly tacky, X: tacky (ii) Adhesion Test of Propylene Polymer (1) Adhesion test was carried out in the same manner as described in the foregoing.

In this connection, preparation conditions of test pieces are shown in the "Reference Example" which will be described later.

(2) Regarding the water resistance test, a coated material prepared by forming a coating layer on a base material using a propylene polymer or other polymer as a primer, coating and curing a base coat on the coating layer and then aging it at room temperature was soaked for 10 days in warm water kept at 40° C. Thereafter, moisture on the surface was dried and then the test was carried out in the same manner as the adhesion test.

(3) Regarding the gasohol resistance test, a coated material prepared by forming a coating layer on a base material using a propylene polymer or other polymer as a primer, coating and curing a base coat on the coating layer and then aging it at room temperature was soaked in a mixed solvent of regular gasoline:ethanol=9:1 kept at 20° C., and then the period until generation of significant peeling of the coating layer was measured.

<Preparation of Test Piece (Base Material)>

REFERENCE EXAMPLE 1

Mixture Composition

Polypropylene block copolymer (trade name: BC06C, mfd. by Japan Polychem, MFR=60) 60 parts by weight Ethylene-propylene random copolymer (trade name: EPO7P, mfd. by JSR) 30 parts by weight Talc (trade name: MT7, mfd. by Fuji Talc) 10 parts by weight As an antioxidant, 0.1 part by weight of tetrakis[methylene-3-(3',5'-di-t-butyl-4'-hydroxyphenyl)-propionate]methane (mfd. by Ciba Specialty Chemicals, IRGANOX 1010) was added to this mixture and mixed for 5 minutes using Henschel mixer, and then the resulting mixture was subjected to kneading granulation using a twin screw kneading machine (KCM 50, mfd. by Kobe Steel) at a setting temperature of 210° C. to obtain a thermoplastic resin composition. Thereafter, using an injection molding machine manufactured by Toshiba Machine (Toshiba IS170) and at a molding temperature of 220° C., this composition was formed into a test piece having a shape of 150 mm×70 mm×3 mm.

REFERENCE EXAMPLE 2

Using an injection molding machine manufactured by Toshiba Machine (Toshiba IS170) and at a molding temperature of 220° C., a polypropylene MA3U manufactured by Japan Polychem (propylene homopolymer, MFR: 15 g/10 min (230° C., 21.18 N loading)) was formed into a test piece having a shape of 150 mm×70 mm×3 mm.

PRODUCTION EXAMPLE 1

(1) Synthesis of dichloro[dimethylsilylene(cyclopentadienyl)(2,4-dimethyl-4H-1-azulenyl)]hafnium (1)-1 Synthesis of Ligand 2-Methylazulene (4.01 g) was dissolved in tetrahydrofuran (56 ml) and cooled to 0° C. in an ice bath, and then 24.8 ml of methyllithium diethyl ether solution (1.14 mol/l) was added dropwise thereto at the same temperature. After completion of the addition, the ice bath was removed and the mixture was stirred for 2 hours. This solution was slowly added dropwise to dimethylsilyl dichloride (34.0 ml, 0.280 mol) tetrahydrofuran solution (140 ml) which was cooled at 0° C. in an ice bath. After completion of the addition, the ice bath was removed, the mixture was stirred for 3 hours, and then the solvent and unreacted dimethylsilyl dichloride were evaporated under a reduced pressure. The residue was mixed with tetrahydrofuran (80 ml) and cooled to 0° C., cyclopentadienyl sodium (2.1 mol/l, 26.9 ml, 56.5 mmol) was gradually added dropwise thereto, and after completion of the addition, the mixture was stirred at room temperature for 12 hours. After completion of the stirring, this was mixed with water and the compound of interest was extracted with diethyl ether. The extract was dehydrated using magnesium sulfate and then dried to obtain unpurified product of the ligand of interest. By purifying the crude product by a silica gel column chromatography using n-hexane as the elution solvent, the ligand of interest (6.29 g) was obtained with a yield of 79%.

(1)-2 Synthesis of Complex

The ligand of interest (6.29 g) obtained in (1)-1 was dissolved in tetrahydrofuran (100 ml) and cooled to 0° C. in an ice bath. An n-buthyllithium n-hexane solution (1.56 mol/l, 28.4 ml) was slowly added dropwise thereto at the same temperature. After completion of the addition, the ice bath was removed, the mixture was stirred for 3 hours, and then the solvent was evaporated under a reduced pressure. After the evaporation, the thus obtained residue was mixed with toluene (60 ml) and then cooled to −78° C. A toluene (140 ml) suspension of hafnium tetrachloride (7.17 g) cooled to −78° C. was gradually added thereto. Then, after removing the cooling bath, this was stirred overnight. After completion of the stirring, the reaction solution was filtered using a G3 frit. By further washing the solid on the frit with toluene and concentrating the filtrate, a brown powder was obtained. The complex of interest was extracted from this brown powder with hot n-hexane (180 ml×3). After drying the extract, the thus obtained solid was suspended and washed with n-hexane (20 ml×5) and then dried under a reduced pressure to obtain the intended dichloro[dimethylsilylene(cyclopentadienyl)-(2,4-dimethyl-4H-1-azulenyl)]hafnium (2.90 g) (yield 25%).

Results of the $^1$H-NMR measurement of this compound are as follows.

$^1$H-NMR (CDCl$_3$): δ 0.85 (s, 3 H), 0.86 (s, 3H), 1.47 (d, J=7.1 Hz, 3 H), 2.25 (s, 3 H), 3.42–3.52 (m, 1 H), 5.42 (dd, J=4.7, 10.1 Hz, 1 H), 5.80–5.85 (m, 2 H), 5.90–5.95 (m, 1 H), 6.16–6.20 (m, 2 H), 6.65 (d, J=11.4 H), 6.80–6.85 (m, 1 H), 6.98–7.02 (m, 1 H).

(2) Chemical Treatment of Clay

Deionized water (110 ml), magnesium sulfate.7H$_2$O (22.2 g) and sulfuric acid (18.2 g) were put into a 1,000 ml round bottom flask and dissolved under stirring. A commercially available granulated montmorillonite (Benclay SL, mfd. by Mizusawa Industrial Chemicals, 16.7 g) was dispersed in this solution, and the suspension was heated to 100° C. spending 2 hours and then stirred at 100° C. for 2 hours. Thereafter, this was cooled to room temperature spending 1 hour, and then the thus obtained slurry was filtered to recover a wet cake. The thus recovered cake was put into a 1,000 ml round bottom flask and again made into a slurry with deionized water (500 ml) and then filtered. This step was performed twice. The finally obtained cake was dried overnight at 110° C. in nitrogen atmosphere to obtain a chemically treated montmorillonite (13.3 g).

(3) Polymerization

The chemically treated montmorillonite (0.44 g) obtained in Production Example 1(2) was mixed with a toluene solution of triethylaluminum (0.4 mmol/ml, 2.0 ml) and stirred at room temperature for 1 hour. This suspension was mixed with toluene (8 ml) and stirred and then the supernatant was discarded. This step was performed twice, and then the precipitate was mixed with toluene to obtain a clay slurry (slurry concentration=99 mg clay/ml).

Triisobutylaluminum manufactured by Tosoh Aqzo (0.114 mmol) was put into another flask, mixed with the thus obtained clay slurry (3.8 ml) and a toluene-diluted solution of the complex (6.02 mg, 11.4 μmol) obtained in Production Example 1(1)-2 and then stirred at room temperature for 10 minutes to obtain a catalyst slurry.

Next, toluene (750 ml), triisobutylaluminium (1.9 mmol) and liquid propylene (180 ml) were put into a 2 liter induction stirring type autoclave. Whole amount of the above-obtained catalyst slurry was put therein at room temperature, the mixture was heated to 60° C., and then the stirring was continued for 1 hour at the same temperature while keeping the total pressure during polymerization at 0.7 MPa. After completion of the stirring, the polymerization was stopped by purging unreacted propylene. When total amount of the toluene solution of polymer was recovered by opening the autoclave and the solvent and clay residue were removed, 23.2 g of a propylene polymer was obtained. Results of the analysis of the thus obtained polymer are shown in Table 1-1.

PRODUCTION EXAMPLE 2

The same procedure of Production Example 1 was performed, except that 17.8 mg (34.2 mmol) of the complex, triisobutylaluminium (0.342 mmol) and the clay slurry (11.4 ml) were used as the materials for clay slurry use, amounts of toluene (1,100 ml), triisobutylaluminium (0.5 mmol) and liquid propylene (264 ml) were changed, and the temperature during polymerization was changed to 80° C., the total pressure to 0.8 MPa and the polymerization period to 1.83 hours. As a result, 245 g of a propylene polymer was obtained. Results of the analysis of the thus obtained polymer are shown in Table 1-1.

PRODUCTION EXAMPLE 3

The same procedure of Production Example 2 was performed, except that amounts of toluene (1,350 ml), and liquid propylene (90 ml) were changed, and the temperature during polymerization was changed to 70° C., the total pressure to 0.31 MPa and the polymerization period to 2 hours. As a result, 44 g of a propylene polymer was obtained. Results of the analysis of the thus obtained polymer are shown in Table 1-1.

PRODUCTION EXAMPLE 4

The same procedure of Production Example 1 was performed, except that liquid propylene (182 ml) and triisobutylaluminium (0.5 mmol) were used. As a result, 39.6 g of a propylene polymer was obtained. Results of the analysis of the thus obtained polymer are shown in Table 1-1.

PRODUCTION EXAMPLE 5

(1) Synthesis of Racemic dichloro{1,1'-dimethylsilylenebis [2-ethyl-4-(2-fluoro-4-biphenyl)-4H-azulenyl]}-hafnium 2-Fluoro-4-bromobiphenyl (6.35 g, 25.3 mmol) was dissolved in a mixed solvent of diethyl ether (50 ml) and n-hexane (50 ml), and an n-pentane solution of t-butyllithium (33 ml, 50.6 mmol, 1.54 N) was added dropwise thereto at −78° C. After stirring at −10° C. for 2 hours, this solution was mixed with 2-ethylazulene (3.55 g, 22.8 mmol) and stirred at room temperature for 2 hours. n-Hexane (30 ml) was added thereto, and the supernatant was removed by decantation. This step was further performed once. At 0° C., n-hexane (30 ml) and tetrahydrofuran (40 ml) were added to the thus obtained yellow precipitate. Next, this was mixed with N-methylimidazole (50 ml) and dimethyldichlorosilane (1.4 ml, 11.4 mmol), warmed up to room temperature and then stirred at room temperature for 1 hour. Thereafter, this was mixed with diluted hydrochloric acid and subjected to phase separation, the resulting organic layer was dried with magnesium sulfate, and then the solvent was evaporated under a reduced pressure to obtain a crude product of dimethylsilylenebis(2-ethyl-4-(2-fluoro-4-biphenyl)-1,4-dihydroazulene (8.3 g).

Next, the thus obtained crude product was dissolved in diethyl ether (30 ml), an n-hexane solution of n-butyllithium (14.9 ml, 22.8 mmol, 1.53 N) was added dropwise thereto at −70° C., and the mixture was gradually warmed up and stirred overnight at room temperature. This was mixed with toluene (200 ml), cooled to −70° C., mixed with hafnium tetrachloride (3.6 g, 11.4 mmol), gradually warmed up and then stirred at room temperature for 4 hours. Most of the solvent was evaporated from the thus obtained slurry under a reduced pressure, the residue was mixed with diethyl ether (50 ml) and then the thus obtained slurry was filtered. When this was washed with diethyl ether (5 ml×2), ethanol (15 ml×2) and n-hexane (10 ml×2), a racemi-meso mixture of dichloro{1,1'-dimethylsilylenebis[2-ethyl-4-(2-fluoro-4-biphenyl)-4H-azulenyl]}hafnium was obtained (4.53 g, yield 42%). As a result of $^1$H-NMR analysis of the thus obtained racemi-meso mixture, it was found that this is a mixture of 76.6% racemic body and 23.4% meso body.

The thus obtained racemi-meso mixture (4.5 g) was suspended in dichloromethane (35 ml) and allowed to undergo light irradiation for 1 hour using a high pressure mercury lamp (100 W). The solvent was evaporated under a reduced pressure, and the thus obtained solid was mixed with toluene (25 ml) and dichloromethane (11 ml) and heated at 60° C. to obtain a uniform solution. Crystals were precipitated when dichloromethane was evaporated under a reduced pressure, and the thus obtained crystals were recovered by filtration, washed twice with hexane (5 ml) and then dried under a reduced pressure to obtain the racemic body (1.79 g).

(2) Chemical Treatment of Clay

A 55.85 g portion of deionized water, 32.70 g of sulfuric acid and 8.01 g of lithium hydroxide were put into a 500 ml round bottom flask and stirred and then 51.65 g of montmorillonite (Mizusawa Smectite, mfd. by Mizusawa Industrial Chemicals) was added thereto, and the mixture was heated to carry out the treatment under reflux for 140 minutes. This was mixed with 300 ml of deionized water and subjected to suction filtration, and then the solid matter was dispersed in 600 ml of deionized water and subjected to suction filtration. This step was performed once again. The residue obtained by filtration was dried at 100° C. to obtain an acid- and metal salt-treated montmorillonite.

A 1.05 g portion of the thus obtained acid- and metal salt-treated montmorillonite was put into a 100 ml round bottom flask and dried by heating at 200° C. for 2 hours under a reduced pressure. This was mixed with 4.0 ml of a toluene solution of triethylaluminum (0.5 mmol/ml) in an atmosphere of purified nitrogen, allowed to undergo the reaction at room temperature for 30 minutes and then washed twice with 30 ml of toluene, thereby obtaining a toluene slurry containing a chemically treated montmorillonite.

(3) Preliminary Polymerization

Toluene was extracted from the toluene slurry obtained in Production Example 5(2) (containing 914.2 mg as the solid content) to adjust the residual toluene content to 1.0 ml. This was mixed with a toluene solution of triisobutylaluminum (0.5 mmol/ml, 0.5 ml) and then with a toluene solution of the racemic body of dichloro{1,1'-dimethylsilylenebis[2-ethyl-4-(2-fluoro-4-biphenyl)-4H-azulenyl]}hafnium synthesized in Production Example 5(1) (3.0 mmol/ml, 9.2 ml) and stirred at room temperature for 1 hour to obtain a catalyst slurry.

In an atmosphere of purified nitrogen, 40 ml of toluene and total amount of the catalyst slurry were put into a 2 liter induction stirring type autoclave. Under stirring, 11.0 g of propylene was put into the autoclave and preliminary polymerization was carried out at 30° C. for 2 hours and then at 50° C. for 0.5 hour. After the preliminary polymerization, unreacted propylene was purged and replaced by purified nitrogen twice under a pressure of 0.5 MPa, and then the preliminary polymerization catalyst was taken out. This product contained 9.7 g of a polymer per 1 g of the chemically treated montmorillonite component.

(4) Polymerization

The atmosphere in a 2 liter induction stirring type autoclave equipped with an anchor type mixing blade was replaced by purified nitrogen, and 750 g of liquid propylene was put into the vessel at 25° C. A toluene solution of triisobutylaluminum (0.1 mmol/ml, 5.0 ml) was put into the vessel under pressure at the same temperature and then the temperature was increased to 70° C. Hydrogen was added to a gas phase hydrogen concentration of 0.2 mol % and then 30.0 mg of the preliminary polymerization catalyst obtained in (3) was added at 70° C. to start polymerization. One hour after, the polymerization was completed by purging unreacted propylene. Amount of the thus obtained propylene polymer was 384 g.

Results of the analysis of the thus obtained polymer are shown in Table 1-1.

In this connection, the peak originated from the carbon atom of methyl group of a propylene unit chain region comprising head to tail bond, measured by $^{13}$C-NMR, was [mmmm]>99.9 (%), and peaks originated from other pentads were hardly found.

PRODUCTION EXAMPLE 6

A 500 ml induction stirring type micro-autoclave was charged with an isotactic polypropylene having high stereospecificity (31.1 g), heptane (180 ml) and Pd/C (mfd. by Sigma-Aldrich Corporation, 10 wt % Pd/C) (7.87 g), and then the system was closed to carry out nitrogen substitution. Thereafter, 8.0 MPa of hydrogen was introduced, temperature was raised to 275° C. and then the stirring was continued for 6 hours. After cooling, the reaction was stopped by purging hydrogen. When total volume of the heptane solution of polymer was recovered by opening the autoclave and the solvent and Pd/C residue were removed, 30.6 g of a propylene polymer was obtained. Results of the analysis of the thus obtained polymer are shown in Table 1-1.

In this connection, physical properties of the highly stereospecific isotactic polypropylene used herein are as follows.
MFR: 15,000
TM: 154.9
Mw: 37,000; Mn: 18,000; Mw/Mn: 2.1
[mmmm]: 98.4%; [mmmr]: 0.0%; [rmrm]: 0.1%; [rrrr]: 0.2%

COMPARATIVE PRODUCTION EXAMPLE 1

Physical properties of Ubetac UT-2115 manufactured by Ube Industries were measured in the same manner. The results are also shown in Table 1-1.

PRODUCTION EXAMPLE 7

The chemically treated montmorillonite (1.02 g) obtained in Production Example 1(2) was mixed with a toluene solution of triethylaluminum (0.45 mmol/ml, 4.5 ml) and stirred at room temperature for 1 hour. This suspension was mixed with toluene (40 ml) and stirred and then the supernatant was discarded. This step was performed twice, and then the precipitate was mixed with toluene to obtain a clay slurry (slurry concentration=99 mg clay/ml)

Triisobutylaluminum manufactured by Tosoh Aqzo (0.08 mmol) was put into another flask, mixed with the thus obtained clay slurry and a toluene-diluted solution of the complex (3.86 mg, 7.45 μmol) obtained in Production Example 1(1)-2 and then stirred at room temperature for 40 minutes to obtain a catalyst slurry.

Next, triisobutylaluminum (1.9 mmol) and whole amount of the above-obtained catalyst slurry were put into a 2 liter induction stirring type autoclave. Liquid propylene (1250 ml) was put therein at room temperature, and then ethylene was put therein to the pressure of 0.07 MPa (partial pressure of ethylene). The mixture was heated to 60° C., and then the stirring was continued for 1 hour at the same temperature. After completion of the stirring, the polymerization was stopped by purging unreacted propylene. When total amount of the toluene solution of polymer was recovered by opening the autoclave and the solvent and clay residue were removed, 144 g of a propylene-ethylene copolymer was obtained, results of the analysis of the thus obtained polymer are shown in table 1-2

PRODUCTION EXAMPLE 8

(1) Chemical Treatment of Clay

Deionized water (72 ml), lithium sulfate.1H$_2$O (11 g) and sulfuric acid (17 g) were put into a 1,000 ml round bottom flask and dissolved under stirring. A commercially available granulated montmorillonite (Benclay SL, mfd. By Mizusawa Industrial Chemicals, 22 g) was dispersed in this solution, and the suspension was heated to 100° C. spending 0.5 hour and then stirred at 100° C. for 5 hours. Thereafter, this was cooled to room temperature spending 1 hour, and then the thus obtained slurry was filtered to recover a wet cake. The thus recovered cake was put into a 1000 ml round bottom flask and again made into a slurry with deionized water (500 ml) and then filtered. This step was performed twice. The finally obtained cake was dried for 1 hour at 200° C. in nitrogen atmosphere to obtain a chemically treated montmorillonite (15.6 g).

(2) Polymerization

The chemically treated montmorillonite (0.25 g) obtained in Production Example 8(1) was mixed with a toluene solution of triethylaluminum (0.5 mmol/ml, 1.0 ml) and stirred at room temperature for 0.5 hour. This suspension was mixed with toluene (10 ml) and stirred and then the supernatant was discarded. This step was performed twice, and then the precipitate was mixed with toluene to obtain a clay slurry (slurry concentration=99 mg clay/ml)

Triisobutylaluminum manufactured by Tosoh Aqzo (0.015 mmol) was put into another flask, mixed with the thus obtained clay slurry and a toluene-diluted solution of the complex (3.89 mg, 7.5 µmol) obtained in Production Example 1(1)-2 and then stirred at room temperature for 10 minutes to obtain a catalyst slurry.

Next, triisobutylaluminum (0.13 mmol) and toluene (1100 ml) and whole amount of the above-obtained catalyst slurry were put into a 2 liter induction stirring type autoclave. Liquid propylene (264 ml) was put therein at room temperature, and then ethylene was put therein to the pressure of 0.025 MPa (partial pressure of ethylene). The mixture was heated to 80° C., and then the mixture gas of ethylene and hydrogen (ethylene:hydrogen=9:1) was fed at the rate of 0.1 MPa·L/hr and propylene was fed so as to keep the total pressure in the vessel at 0.85 MPa. The stirring was continued for 1 hour at the same temperature. After completion of the stirring, the polymerization was stopped by purging unreacted ethylene and propylene. When total amount of the toluene solution of polymer was recovered by opening the autoclave and the solvent and clay residue were removed, 303 g of a propylene-ethylene copolymer was obtained. Results of the analysis of the thus obtained polymer are shown in Table 1-2.

PRODUCTION EXAMPLE 9

The same procedure of Production Example 8 was performed, except that ethylene gas was used instead of the mixture gas of ethylene and hydrogen, and polymerization time was changed to 1.5 hours. As a result, 146 g of a propylene-ethylene copolymer was obtained. Results of the analysis of thus obtained polymer are shown in Table 1-2.

PRODUCTION EXAMPLE 10

The same procedure of Production Example 8 was performed, except that the amount of liquid propylene (160 ml), the temperature (80° C.), the polymerization time (1.5 hours), the total pressure (0.80 MPa), and ethylene partial pressure (0.20 MPa) were changed. As a result, 66 g of a propylene-ethylene copolymer was obtained. Results of the analysis of thus obtained polymer are shown in Table 1-2.

COMPARATIVE PRODUCTION EXAMPLE 2

Physical properties of Ubetac UT-2215 manufactured by Ube Industries were measured in the same manner. The results are also shown in Table 1-2.

COMPARATIVE PRODUCTION EXAMPLE 3

Physical properties of Tafmer S4030 manufactured by Mitsui Chemicals were measured in the same manner. The results are also shown in Table 1-2.

TABLE 1-1

| Item | Unit | Prod. Ex. 1 | Prod. Ex. 2 | Prod. Ex. 3 | Prod. Ex. 4 | Prod. Ex. 5 | Prod. Ex. 6 | UT-2115 |
|---|---|---|---|---|---|---|---|---|
| Primary structure | | | | | | | | |
| Mw | | 110,000 | 66,000 | 69,000 | 130,000 | 110,000 | 41,000 | 26,000 |
| Mn | | 31,000 | 20,000 | 18,000 | 41,000 | 53,000 | 19,000 | 4,500 |
| Mw/Mn | | 3.5 | 3.3 | 3.8 | 3.2 | 2.1 | 2.2 | 5.8 |
| $S_1/S$ | (%) | 41.1 | 35 | 29.7 | 45.4 | >99.9 | 10.7 | 43.9 |
| $S_3/S$ | (%) | 1.5 | 2.7 | 2.5 | 1.3 | n.d. | 6.5 | 6.6 |
| $S_4/S$ | (%) | 4.2 | 4.9 | 6.1 | 3.8 | n.d. | 11.5 | 2.1 |
| $4 + 2 S_1/S_2$ | | 9.04 | 8.27 | 7.64 | 9.82 | >1000 | 5.68 | 11.3 |
| Crystallinity | (%) | 14.8 | 12.6 | 10.5 | 16.4 | 48 | n.d. | — |
| Melting point Tm | (°C.) | n.d. | n.d. | n.d. | n.d. | 156 | n.d. | 152 |
| Crystal melting calorie | (J/g) | n.d. | n.d. | n.d. | n.d. | 157 | n.d. | 18 |
| 100% Elution temp. | (°C.) | 55 | 35 | 35 | 65 | 120 | 25 | 75 |
| Physical properties | | | | | | | | |
| Insoluble matter (10 wt % in boiling heptane) | (%) | <1 | <1 | <1 | <1 | 98.3 | <1 | 45.4 |
| Insoluble matter (10 wt % in toluene) | (%) | <1 | <1 | <1 | 1.5 | 96.6 | <1 | 31.6 |
| Non-tackiness | | ◯ | ◯ | ◯ | ◯ | ◯ | X | Δ |

In this table, "n.d." represents "not detected".

TABLE 1-2

| Item | Unit | Prod. Ex. 7 | Prod. Ex. 8 | Prod. Ex. 9 | Prod. Ex. 10 | UT-2215 | S4030 |
|---|---|---|---|---|---|---|---|
| Primary structure | | | | | | | |
| Mw | | 91,000 | 49,000 | 60,000 | 70,000 | 24,000 | 310,000 |
| Mn | | 18,000 | 12,000 | 13,000 | 15,000 | 4,400 | 57,000 |
| Mw/Mn | | 5.0 | 4.1 | 4.6 | 4.7 | 5.6 | 5.5 |
| $S_1/S$ | (%) | 35.7 | 33.1 | 33.7 | 26.6 | 35 | 13 |
| $4 + 2S_1/S_2$ | | 8.8 | 7.9 | 7.8 | 7.3 | 10.0 | 6.4 |
| [E] | (wt %) | 0.3 | 1.1 | 2.2 | 8.7 | 2.6 | 12.8 |
| Crystallinity | (%) | 16.3 | 15.5 | 15.2 | 12.0 | 18.1 | 5.7 |
| Melting point Tm | (° C.) | n.d. | n.d. | n.d. | n.d. | 143 | 115.9 |
| Crystal Melting calorie | (J/g) | n.d. | n.d. | n.d. | n.d. | 13 | 2.3 |
| 100% Elution temp. | (° C.) | 65 | 55 | 55 | 45 | 105 | 95 |
| Physical properties | | | | | | | |
| Insoluble matter (10 wt % in heptane) | (%) | <1 | <1 | <1 | <1 | 42.6 | filtration was impossible |
| Insoluble matter (10 wt % in toluene) | (%) | <1 | <1 | <1 | <1 | 29.7 | filtration was impossible |
| Non-tackiness | | ◯ | ◯ | ◯ | ◯ | X | ◯ |

EXAMPLE 1

(1) Maleic Anhydride Modification of Propylene Polymer

A stainless steel pressure reaction vessel equipped with a thermometer and a stirrer was charged with chlorobenzene (80 g), the propylene polymer obtained in Production Example 1(3) (20 g) and maleic anhydride (4 g), the atmosphere in the vessel was replaced by nitrogen gas, and then the temperature was elevated to 132° C. After the temperature reached 132° C., 8 g of dicumyl peroxide (DCPO) chlorobenzene solution (20 wt %) was supplied using a metering pump for 5.5 hours, and then the reaction was carried out by continuing the stirring at the same temperature for 3 hours. After completion of the reaction, the system was cooled to about room temperature, acetone was added and then the precipitated polymer was collected by filtration. The precipitation with acetone and collection by filtration were repeated, and the finally obtained polymer was washed with acetone. The polymer obtained after washing was dried under a reduced pressure to obtain a modified polymer as a white powder. When infrared absorption spectrum measurement and neutralization titration of this modified polymer were carried out, the maleic anhydride group content was 3.3 wt %.

A 15 g portion of the thus obtained maleic anhydride-modified propylene polymer was mixed with 135 g of toluene, heated to 100° C. and dissolved in 1 hour. The thus obtained solution was cooled to about room temperature and then passed through #400 stainless-steel screen to prepare 10 wt % solution of the maleic anhydride-modified propylene polymer.

(2) Evaluation of Physical Properties of Modified Propylene Polymer

A toluene solution of the maleic anhydride-modified propylene polymer obtained in Example 1(1) was spray-coated on each of the injection-molded test pieces (the surfaces of which were wiped with isopropyl alcohol) prepared in Reference Examples 1 and 2. In this case, the coating amount was set to 3 to 5 g/m². Next, this molded test piece was allowed to stand at 25° C. for 1 hour and then dried at 80° C. for 30 minutes in a safety valve dryer. Next, this dried product was allowed to stand at 25° C. for 1 hour, and then a base coat prepared by blending an acrylpolyol urethane paint Retan PG•80 III (trade name, mfd. by Kansai Paint) with a predetermined amount of a curing agent and adjusting the viscosity to 12 to 13 seconds with a special purpose thinner using Ford cup No. 4 was spray-coated on the coating layer to a dry coat amount of 50 to 60 g and cured at 100° C. for 30 minutes in the safety valve dryer. This was further cured by allowing it to stand at 25° C. for 10 days. The thus obtained coated product was subjected to an interlayer adhesion test. Its water resistance test and gasohol resistance test were also carried out. The results are shown in Table 2-1.

EXAMPLE 2

The modification treatment and preparation of coated product were carried out by the same methods as Example 1, and evaluation tests on physical properties were carried out in the same manner, except that the reaction was carried out at 110° C. using 20 g of the propylene polymer synthesized in Production Example 2, 10 g of maleic anhydride and 7 g of dicumyl peroxide (DCPO) chlorobenzene solution. (20 wt %). The results are shown in Table 2-1.

EXAMPLE 3

The modification treatment and preparation of coated product were carried out by the same methods as Example 1, and evaluation tests on physical properties were carried out in the same manner, except that the propylene polymer synthesized in Production Example 2 was used. The results are shown in Table 2-1.

EXAMPLE 4

The modification treatment and preparation of coated product were carried out by the same methods as Example 1, and evaluation tests on physical properties were carried out in the same manner, except that the propylene polymer synthesized in Production Example 3 was used. The results are shown in Table 2-1.

EXAMPLE 5

The modification treatment and preparation of coated product were carried out by the same methods as Example 1, and evaluation tests on physical properties were carried out in the same manner, except that the propylene polymer synthesized in Production Example 4 was used. The results are shown in Table 2-1.

EXAMPLE 6

The modification treatment and preparation of coated product were carried out by the same methods as Example 1, and evaluation tests on physical properties were carried out in the same manner, except that methacrylic acid (5 g) was added instead of maleic anhydride (4 g) and amount of the dicumyl peroxide (DCPO) chlorobenzene solution (20 wt %) was changed to 2.5 g. The results are shown in Table 2-1.

EXAMPLE 7

The modification treatment and preparation of coated product were carried out by the same methods as Example 6, and evaluation tests on physical properties were carried out in the same manner, except that 2-hydroxyethyl methacrylate (5 g) was added instead of methacrylic acid (5 g). The results are shown in Table 2-1.

EXAMPLE 8

The modification treatment and preparation of coated product were carried out by the same methods as Example 6, and evaluation tests on physical properties were carried out in the same manner, except that 2-hydroxyethyl methacrylate (5 g) and styrene (5 g) were added instead of methacrylic acid (5 g). The results are shown in Table 2-1.

COMPARATIVE EXAMPLE 1

The modification treatment and preparation of coated product were carried out by the same methods as Example 1, except that the propylene polymer synthesized in Production Example 5 was used. Since the thus obtained modified polypropylene polymer showed poor solubility in toluene and 96% thereof was insoluble matter, the coating evaluation cannot be made.

COMPARATIVE EXAMPLE 2

The modification treatment and preparation of coated product were carried out by the same methods as Example 1, and evaluation tests on physical properties were carried out in the same manner, except that the propylene polymer synthesized in Production Example 6 was used. The results are shown in Table 2-2.

COMPARATIVE EXAMPLE 3

The modification treatment and preparation of coated product were carried out by the same methods as Example 1, and evaluation tests on physical properties were carried out in the same manner, except that Ubetac UT-2115 manufactured by Ube Industries (a Ziegler-Natta catalyst based polypropylene) was used. The results are shown in Table 2-2.

COMPARATIVE EXAMPLE 4

The modification treatment and preparation of coated product were carried out by the same methods as Example 1, and evaluation tests on physical properties were carried out in the same manner, except that Tafmer XR-110T manufactured by Mitsui Chemicals (a propylene-butene-1 copolymer, propylene component:butene-1 component=76:24) was used. The results are shown in Table 2-2.

COMPARATIVE EXAMPLE 5

The evaluation was carried out in the same manner as in Example 1(2), using CP-343-1 manufactured by Eastman Chemical (a maleic anhydride-modified chlorinated polypropylene) as the modified polymer. The results are shown in Table 2-2.

EXAMPLE 9

The modification treatment and preparation of coated product were carried out by the same methods as Example 1, and evaluation tests on physical properties were carried out in the same manner, except that the propylene-ethylene copolymer synthesized in Production Example 7 was used. The results are shown in Table 2-3.

EXAMPLE 10

The modification treatment and preparation of coated product were carried out by the same methods as Example 1, and evaluation tests on physical properties were carried out in the same manner, except that the propylene-ethylene copolymer synthesized in Production Example 8 was used. The results are shown in Table 2-3.

EXAMPLE 11

The modification treatment and preparation of coated product were carried out by the same methods as Example 2, and evaluation tests on physical properties were carried out in the same manner, except that the propylene-ethylene copolymer synthesized in Production Example 8 was used. The results are shown in Table 2-3.

EXAMPLE 12

The modification treatment and preparation of coated product were carried out by the same methods as Example 1, and evaluation tests on physical properties were carried out in the same manner, except that the propylene-ethylene copolymer synthesized in Production Example 9 was used. The results are shown in Table 2-3.

EXAMPLE 13

The modification treatment and preparation of coated product were carried out by the same methods as Example 6, and evaluation tests on physical properties were carried out in the same manner, except that the propylene-ethylene copolymer synthesized in Production Example 8 was used. The results are shown in Table 2-3.

EXAMPLE 14

The modification treatment and preparation of coated product were carried out by the same methods as Example 7, and evaluation tests on physical properties were carried out in the same manner, except that the propylene-ethylene copolymer synthesized in Production Example 8 was used. The results are shown in Table 2-4.

EXAMPLE 15

The modification treatment and preparation of coated product were carried out by the same methods as Example 8, and evaluation tests on physical properties were carried out in the same manner, except that the propylene-ethylene copolymer synthesized in Production Example 8 was used. The results are shown in Table 2-4.

COMPARATIVE EXAMPLE 6

The modification treatment and preparation of coated product were carried out by the same methods as Example 1, and evaluation tests on physical properties were carried out in the same manner, except that the propylene-ethylene copolymer synthesized in Production Example 9 was used. The results are shown in Table 2-4.

COMPARATIVE EXAMPLE 7

The modification treatment and preparation of coated product were carried out by the same methods as Example 1, and evaluation tests on physical properties were carried out in the same manner, except that the propylene-ethylene copolymer synthesized in Production Example 9 was used. The results are shown in Table 2-4.

TABLE 2-1

| Item | Remarks | Unit | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| | | | Modification condition | | | | | | | |
| Charging amount | Polymer | (wt part) | Prod. Ex. 1 100 | Prod. Ex. 2 100 | Prod. Ex. 2 | Prod. Ex. 3 | Prod. Ex. 4 | Prod. Ex. 1 100 | Prod. Ex. 1 100 | Prod. Ex. 1 100 |
| | Monomer | (wt part) | Maleic anhydride 20 | Maleic anhydride 50 | The same as Ex. 1 | The same as Ex. 1 | The same as Ex. 1 | Methacrylic Acid 25 | HEMA 25 | HEMA 25 St 25 |
| | Solvent | (wt part) | 400 | 400 | | | | 400 | 400 | 400 |
| | DCPO | (wt part) | 8 | 7 | | | | 2.5 | 2.5 | 2.5 |
| Temperature | | (° C.) | 132 | 110 | | | | 132 | 132 | 132 |
| Graft ratio | | (wt %) | 3.3 | 1.1 | 3.2 | 3.2 | 3.3 | 1.1 | 1.0 | 2.5 |
| | | | Physical properties | | | | | | | |
| Solubility | | | ○ | ○ | ○ | ○ | ○ | ○ | ○ | ○ |
| | Insoluble matter * | (%) | <1 | <1 | <1 | <1 | <1 | <1 | <1 | <1 |
| Non-tackiness | | | ○ | ○ | ○ | ○ | ○ | ○ | ○ | ○ |
| | | | Evaluation of modified polymer | | | | | | | |
| | Base material | | | | | | | | | |
| Adhesiveness | Ref. Ex. 1 | (no./no.) | 100/100 | 100/100 | 100/100 | 100/100 | 100/100 | 100/100 | 100/100 | 100/100 |
| | Ref. Ex. 2 | | 100/100 | 100/100 | 100/100 | 100/100 | 100/100 | 100/100 | 100/100 | 100/100 |
| Gasohol resistance | Ref. Ex. 1 | (min) | >90 | 77 | >90 | 59 | >90 | >90 | >90 | >90 |
| | Ref. Ex. 2 | | 85 | 32 | 75 | 30 | >90 | 45 | 45 | 80 |
| Water resistance | Ref. Ex. 1 | (no./no.) | 100/100 | 100/100 | 100/100 | 100/100 | 100/100 | 100/100 | 100/100 | 100/100 |
| | Ref. Ex. 2 | | 100/100 | 100/100 | 100/100 | 100/100 | 100/100 | 100/100 | 100/100 | 100/100 |

* Insoluble matter (in 10 wt % toluene)
Note:
HEMA represents 2-hydroxyethyl methacrylate
St represents styrene

TABLE 2-2

| Item | Remarks | Unit | Comp. Ex. 1 | Comp. Ex. 2 | Comp. Ex. 3 | Comp. Ex. 4 | Comp. Ex. 5 |
|---|---|---|---|---|---|---|---|
| | | | Modification condition | | | | |
| Charging amount | Polymer | | Prod. Ex. 5 | Prod. Ex. 6 | UT-2115 | XR110T | CP-343-1 |
| | Monomer | (wt part) | The same as Ex. 1 | The same as Ex. 1 | The same as Ex. 1 | The same as Ex. 1 | |
| | Solvent | (wt part) | | | | | |
| | Initiator | (wt part) | | | | | |
| Temperature | | (° C.) | | | | | |
| Graft ratio | | (wt %) | 3.4 | 3.5 | 3.4 | 3.0 | |
| | | | Physical properties | | | | |
| Solubility | | | X | ○ | X | X | ○ |
| | Insoluble matter * | (%) | 96 | <1 | 29.5 | 67.4 | <1 |
| Non-tackiness | | | ○ | X | X | ○ | ○ |

TABLE 2-2-continued

| Item | Remarks | Unit | Comp. Ex. 1 | Comp. Ex. 2 | Comp. Ex. 3 | Comp. Ex. 4 | Comp. Ex. 5 |
|---|---|---|---|---|---|---|---|
| | | | Evaluation of modified polymer | | | | |
| Adhesiveness | Base material Ref. Ex. 1 | (no./no.) | | 40/100 | 60/100 | 40/100 | 80/100 |
| | Ref. Ex. 2 | | | 0/100 | 20/100 | 0/100 | 0/100 |
| Gasohol resistance | Ref. Ex. 1 | (min) | | 10 | 15 | >90 | >90 |
| | Ref. Ex. 2 | | | 8 | 10 | 50 | 66 |
| Water resistance | Ref. Ex. 1 | (no./no.) | | 20/100 | 20/100 | 20/100 | 20/100 |
| | Ref. Ex. 2 | | | 0/100 | 0/100 | 0/100 | 0/100 |

* Insoluble matter (in 10 wt % toluene)

TABLE 2-3

| Item | Remarks | Unit | Ex. 9 | Ex. 10 | Ex. 11 | Ex. 12 | Ex. 13 |
|---|---|---|---|---|---|---|---|
| | | | Modification condition | | | | |
| charging amount | Polymer | | Prod. EX. 7 | Prod. EX. 8 | Prod. EX. 8 | Prod. EX. 9 | Prod. EX. 8 |
| | monomer | (wt part) | The same as Ex. 1 | The same as Ex. 1 | The same as Ex. 2 | The same as Ex. 1 | The same as Ex. 6 |
| | Solvent | (wt part) | | | | | |
| | Initiator | (wt part) | | | | | |
| Temperature | | (° C.) | | | | | |
| Graft ratio | | (wt %) | 3.0 | 3.1 | 0.9 | 3.0 | 1.1 |
| | | | Physical properties | | | | |
| solubility | | | ○ | ○ | ○ | ○ | ○ |
| | Insoluble matter* | (%) | <1 | <1 | <1 | <1 | <1 |
| Non-tackiness | | | ○ | ○ | ○ | ○ | ○ |
| | | | Evaluation of modified polymer | | | | |
| Adhesiveness | Base material Ref. Ex. 1 | (no./no.) | 100/100 | 100/100 | 100/100 | 100/100 | 100/100 |
| Gasohol resistance | Ref. Ex. 1 | (min) | >90 | >90 | 42 | 80 | 42 |
| Water resistance | Ref. Ex. 1 | (no./no.) | 100/100 | 100/100 | 100/100 | 100/100 | 100/100 |

Insoluble matter* (in 10 wt % toluene)

TABLE 2-4

| Item | Remarks | Unit | Ex. 14 | Ex. 15 | Comp. Ex. 6 | Comp. Ex. 7 | Comp. Ex. 8 |
|---|---|---|---|---|---|---|---|
| | | | Modification condition | | | | |
| charging amount | Polymer | | Prod. EX. 8 | Prod. EX. 8 | Prod. EX. 9 | UT-2215 | S4030 |
| | monomer | (wt part) | The same as Ex. 7 | The same as Ex. 8 | The same as Ex. 1 | The same as Ex. 1 | The same as Ex. 1 |
| | Solvent | (wt part) | | | | | |
| | Initiator | (wt part) | | | | | |
| Temperature | | (° C.) | | | | | |
| Graft ratio | | (wt %) | 1.0 | 2.5 | 3.0 | 3.1 | 3.0 |
| | | | Physical properties | | | | |
| solubility | | | ○ | ○ | ○ | X | X |
| | Insoluable matter* | (%) | <1 | <1 | <1 | 17.5 | filtration was impossible |
| Non-tackiness | | | ○ | ○ | X | X | ○ |

TABLE 2-4-continued

| Item | Remarks | Unit | Ex. 14 | Ex. 15 | Comp. Ex. 6 | Comp. Ex. 7 | Comp. Ex. 8 |
|---|---|---|---|---|---|---|---|
| | | Evaluation of modified polymer | | | | | |
| | Base material | | | | | | |
| Adhesiveness | Ref. Ex. 1 | (no./no.) | 100/100 | 100/100 | 40/100 | 60/100 | 0/100 |
| Gasohol resistance | Ref. Ex. 1 | (min) | 40 | 80 | 15 | 15 | 50 |
| Water resistance | Ref. Ex. 1 | (no./no.) | 100/100 | 100/100 | 20/100 | 20/100 | 0/100 |

Insoluble matter* (in 10 wt % toluene)

As has been described in the foregoing, the invention renders possible provision of a novel propylene polymer which does not contain halogens such as chlorine and can add good adhesiveness and coating ability to crystalline propylene polymer base materials. Thus, the invention has industrially great values.

While the invention has been described in detail and with reference to specific embodiments thereof, it will be apparent to one skilled in the art that various changes and modifications can be made therein without departing from the gist and scope thereof.

This application is based on Japanese patent application No. 2001-336078 filed on Nov. 1, 2001, the entire contents thereof being hereby incorporated by reference.

What is claimed is:

1. A propylene polymer, comprising:
   a propylene polymer main chain having a stereo-block structure containing an isotactic block, and
   a side chain containing a carboxylic acid group, an acid anhydride group or a carboxylic acid ester group,
   wherein when said propylene polymer is dissolved in toluene to a concentration of 10% by weight at 25° C., the insoluble matter is 1% by weight or less based on the total weight of the polymer.

2. The propylene polymer according to claim 1, wherein the propylene main chain comprises a propylene and ethylene component at the ratio of 95<[Propylene]≦100 (weight %) and 5>[Ethylene]≧0 (weight %).

3. The propylene polymer according to claim 1, wherein the propylene polymer main chain is produced by a single site catalyst.

4. The propylene polymer according to claim 1, wherein when the propylene polymer main chain is dissolved in heptane to a concentration of 10% by weight at 98° C., the insoluble matter is 1% by weight or less based on the total weight of the polymer.

5. The propylene polymer according to claim 1, wherein the propylene polymer main chain has a weight average molecular weight Mw of 5,000 or more and 200,000 or less when measured by GPC.

6. The propylene polymer according to claim 1, wherein a distinctive peak corresponding to a crystal melting calorie of 1 joule/g or more at a melting point (Tm) measured by DSC is not present in the propylene polymer main chain.

7. The propylene polymer according to claim 3, wherein the single site catalyst is a $C_1$-symmetric ansa-metallocene compound having a transition metal-containing bridge group.

8. The propylene polymer according to claim 1, wherein substantially all components of the propylene polymer main chain and/or propylene polymer are eluted at 60° C. or less when subjected to temperature rising elution fractionation with o-dichlorobenzene.

9. The propylene polymer according to claim 1, wherein the side chain carboxylic acid group, acid anhydride group or carboxylic acid ester group in claim 1 is introduced into the propylene polymer main chain by allowing a polymerizable compound to undergo graft copolymerization.

10. The propylene polymer according to claim 9, wherein the polymerizable compound is an unsaturated carboxylic acid compound comprising an unsaturated carboxylic acid having from 3 to 25 carbon atoms, an acid anhydride thereof or an ester thereof.

11. The propylene polymer according to claim 10, wherein the unsaturated carboxylic acid compound comprising an unsaturated carboxylic acid having from 3 to 25 carbon atoms, an acid anhydride thereof or an ester thereof is maleic anhydride.

12. The propylene polymer according to claim 1 having the following characteristics (a) and (b);
   (a) when said propylene polymer is dissolved in toluene to a concentration of 10% by weight at 25° C., the insoluble matter is 1% by weight or less based on a total weight of said polymer, and
   (b) an adhesiveness of said propylene polymer as measured by an adhesion test to a polypropylene base material is 50/100 or more;
   wherein said adhesion test is a cross-cut tape method.

13. An adhesion composition prepared by dissolving 1 weight part or more of the propylene polymer according to claim 1 in a solvent having a solubility parameter of 11 $(cal/cm^3)^{1/2}$ or less.

14. An adhesion composition prepared by dissolving 1 weight part or more of the propylene polymer according to claim 12 in a solvent having a solubility parameter of 11 $(cal/cm^3)^{1/2}$ or less.

15. An adhesive for an olefin polymer having crystallinity, which comprises the propylene polymer according to claim 1.

16. An adhesive for an olefin polymer having crystallinity, which comprises the propylene polymer according to claim 12.

17. An adhesive for an olefin polymer having crystallinity, which comprises the composition according to claim 13.

18. An adhesive for an olefin polymer having crystallinity, which comprises the composition according to claim 14.

19. A method of making a propylene polymer, comprising:
   polymerizing propylene or a mixture of propylene and ethylene in the presence of a single site catalyst which is a $C_1$-symmetric ansa-metallocene compound having a transition metal-containing bridge group, thereby obtaining a propylene polymer main chain having a stereo-block structure containing an isotactic block, and graft-copolymerizing said propylene polymer main chain with a polymerizable monomer containing a carboxylic acid group, an acid anhydride group or a carboxylic acid ester group; to obtain a side chain containing a carboxylic acid group, an acid anhydride group or a carboxylic acid ester group, wherein when said propylene polymer is dissolved in toluene to a concentration of 10% by weight at 25° C., the insoluble matter is 1% by weight or less based on the total weight of the polymer.

20. The method according to claim 19, wherein said propylene polymer main chain is a propylene homopolymer or a propylene-ethylene copolymer having an ethylene content of less than 5% by weight, based on a total weight of said main chain.

21. The method according to claim 19, wherein a grafted amount of at least one graft polymerization unit obtained from said polymerizable monomer containing a carboxylic acid group, an acid anhydride group or a carboxylic acid ester group is 0.01 to 25% by weight.

22. The method according to claim 19, wherein said $C_1$-symmetric ansa-metallocene compound having a transition metal-containing bridge group is a $C_1$-symmetric ansa-metallocene compound of a crosslinked group IV transition metal compound having a conjugated five-membered ring ligand.

23. A propylene polymer, comprising:

a propylene polymer main chain having a stereo-block structure containing an isotactic block, and a side chain containing a carboxylic acid group, an acid anhydride group or a carboxylic acid ester group, wherein when said propylene polymer is dissolved in toluene to a concentration of 10% by weight at 25° C., the insoluble matter is 1% by weight or less based on the total weight of the polymer;

wherein the propylene polymer main chain is produced by a single site catalyst; and wherein the single site catalyst is a $C_1$-symmetric ansa-metallocene compound having a transition metal-containing bridge group.

* * * * *